US012795807B2

(12) United States Patent
Busky et al.

(10) Patent No.: US 12,795,807 B2
(45) Date of Patent: Nov. 10, 2026

(54) DEVICE FOR CONTROLLING THE BEAM CURRENT IN A SYNCHROCYCLOTRON

(71) Applicant: Mevion Medical Systems, Inc., Littleton, MA (US)

(72) Inventors: Michael Busky, Berlin, MA (US); Yan Zhang, Hudson, MA (US); Miles Wagner, Brookline, MA (US); Gerrit Townsend Zwart, Durham, NH (US); James Cooley, Boxborough, MA (US); Mark Jones, Bolton, MA (US)

(73) Assignee: Mevion Medical Systems, Inc., Littleton, MA (US)

( * ) Notice: Subject to any disclaimer, the term of this patent is extended or adjusted under 35 U.S.C. 154(b) by 0 days.

(21) Appl. No.: 18/998,038

(22) PCT Filed: Jul. 25, 2023

(86) PCT No.: PCT/US2023/028572
§ 371 (c)(1),
(2) Date: Jan. 23, 2025

(87) PCT Pub. No.: WO2024/025879
PCT Pub. Date: Feb. 1, 2024

(65) Prior Publication Data

US 2026/0025905 A1 Jan. 22, 2026

Related U.S. Application Data

(60) Provisional application No. 63/392,264, filed on Jul. 26, 2022.

(51) Int. Cl.

| | |
|---|---|
| ***H05H 13/02*** | (2006.01) |
| ***H05H 1/24*** | (2006.01) |
| ***H05H 1/54*** | (2006.01) |

(52) U.S. Cl.
CPC ............ *H05H 13/02* (2013.01); *H05H 1/245* (2021.05); *H05H 1/54* (2013.01); *H05H 2242/24* (2021.05);
(Continued)

(58) Field of Classification Search
None
See application file for complete search history.

(56) References Cited

U.S. PATENT DOCUMENTS

| | | | |
|---|---|---|---|
| 4,492,360 | A | 1/1985 | Lee et al. |
| 8,575,563 | B2 | 11/2013 | Cameron et al. |

(Continued)

FOREIGN PATENT DOCUMENTS

| | | | |
|---|---|---|---|
| EP | 0544405 | A1 | 6/1993 |
| EP | 1041579 | A1 | 10/2000 |

(Continued)

OTHER PUBLICATIONS

International Preliminary Report on Patentability received for PCT Patent Application No. PCT/US2023/028572, mailed on Feb. 6, 2025, 13 pages.

(Continued)

*Primary Examiner* — Wilson Lee
(74) *Attorney, Agent, or Firm* — ARENTFOX SCHIFF LLP

(57) ABSTRACT

An example particle accelerator includes a particle source to provide particles to a magnetic cavity; circuitry to provide a radio frequency (RF) voltage to the magnetic cavity to accelerate particles from the ionized plasma in orbits in the magnetic cavity, where the RF voltage has a slope that is less when the particles are injected into the magnetic cavity than when the particles are accelerated in the magnetic cavity;
(Continued)

and an extraction channel to receive the particles from the magnetic cavity for output as a particle beam from the particle accelerator.

20 Claims, 15 Drawing Sheets

(52) U.S. Cl.
CPC ..... *H05H 2245/30* (2021.05); *H05H 2277/11* (2013.01)

(56) References Cited

U.S. PATENT DOCUMENTS

| | | | | |
|---|---|---|---|---|
| 8,748,852 | B2 | 6/2014 | Jongen | |
| 8,791,656 | B1 | 7/2014 | Zwart et al. | |
| 8,933,650 | B2 | 1/2015 | O'Neal, III et al. | |
| 8,970,137 | B2 | 3/2015 | Gall et al. | |
| 9,723,705 | B2 | 8/2017 | Gall et al. | |
| 9,730,308 | B2 | 8/2017 | Zwart et al. | |
| 10,028,369 | B2 | 7/2018 | Radovinsky | |
| 10,485,995 | B2 | 11/2019 | Anferov et al. | |
| 10,603,518 | B2 | 3/2020 | Hassan et al. | |
| 11,009,141 | B2 | 5/2021 | Irie | |
| 11,291,861 | B2 | 4/2022 | Cooley et al. | |
| 11,627,652 | B1 * | 4/2023 | Yanovitz | H05H 1/4652 315/141 |
| 12,168,147 | B2 | 12/2024 | Cooley et al. | |
| 2013/0187060 | A1 | 7/2013 | Jongen | |
| 2014/0094638 | A1 | 4/2014 | Gall et al. | |
| 2014/0094639 | A1 | 4/2014 | Zwart et al. | |
| 2014/0094640 | A1 | 4/2014 | Gall et al. | |
| 2014/0094643 | A1 | 4/2014 | Gall et al. | |
| 2014/0371511 | A1 | 12/2014 | Zwart et al. | |
| 2022/0061143 | A1 * | 2/2022 | Nighan, Jr. | G01V 5/22 |
| 2022/0070995 | A1 * | 3/2022 | Liu | H05H 7/22 |
| 2022/0104339 | A1 * | 3/2022 | Mueller | A61N 5/10 |
| 2022/0210904 | A1 * | 6/2022 | Mori | H05H 9/005 |
| 2022/0249857 | A1 * | 8/2022 | Schwarz | A61N 2/02 |
| 2022/0272827 | A1 | 8/2022 | Zhang et al. | |
| 2022/0305272 | A1 * | 9/2022 | Makdissi | A61N 1/37518 |
| 2023/0300969 | A1 * | 9/2023 | Dollinger | H05H 7/18 315/505 |

FOREIGN PATENT DOCUMENTS

| | | | |
|---|---|---|---|
| EP | 3307031 | A1 | 4/2018 |
| JP | 2018-110133 | A | 7/2018 |
| JP | 2022-524101 | A | 4/2022 |
| WO | 2014/052709 | A2 | 4/2014 |
| WO | 2023/132960 | A1 | 7/2023 |

OTHER PUBLICATIONS

International Search Report & Written Opinion received for PCT Patent Application No. PCT/US2023/028572,mailed on Jan. 8, 2024.

Office Action received for Japanese Patent Application No. 2025-504348, mailed on Feb. 3, 2026, 15 pages (8 pages of English Translation and 7 pages of Original Document).

Office Action received for Japanese Patent Application No. 2025-504348, mailed on Jul. 14, 2026, 9 pages (4 pages of English Translation and 5 pages of Original Document).

* cited by examiner

DEVICE FOR CONTROLLING THE BEAM CURRENT IN A SYNCHROCYCLOTRON

CROSS-REFERENCE TO RELATED APPLICATION

This application is a U.S. national stage entry of PCT Application No. PCT/US2023/028572 which was filed on Jul. 25, 2023. PCT Application No. PCT/US2023/028572 claims priority to U.S. Provisional Application No. 63/392,264, which was filed on Jul. 26, 2022. This application claims priority to both PCT Application No. PCT/US2023/028572 and to U.S. Provisional Application No. 63/392,264. Both PCT Application No. PCT/US2023/028572 and U.S. Provisional Application No. 63/392,264 are incorporated into this application by reference.

TECHNICAL FIELD

This specification describes examples of techniques for controlling beam current in a particle accelerator.

BACKGROUND

Particle therapy systems use a particle accelerator to generate a particle beam for treating irradiation targets, such as tumors. An attribute of the particle beam is its beam current or beam intensity. Beam current is a function of the number of particles injected into the particle accelerator. Greater beam currents can enable treatment of the irradiation target at higher dose rates.

SUMMARY

An example particle accelerator includes a particle source to provide particles to a magnetic cavity; circuitry to provide a radio frequency (RF) voltage to the magnetic cavity to accelerate particles from ionized plasma in orbits in the magnetic cavity, where the RF voltage has a slope that is less when the particles are injected into the magnetic cavity than when the particles are accelerated in the magnetic cavity; and an extraction channel to receive the particles from the magnetic cavity for output as a particle beam from the particle accelerator. The particle accelerator may include one or more of the following features, either alone or in combination.

The RF voltage may have a first slope when the particles are injected into the magnetic cavity and a second slope when the particles are accelerated in the magnetic cavity. The first slope may be less than the second slope at least during RF voltage downslope. The first slope may be at least 50% less than the second slope. The first slope may be at least 30% less than the second slope. The first slope may be at least 20% less than the second slope. The slope that is less when the particles are injected into the magnetic cavity may correspond to an increase in current in the particle beam. The slope that is less when the particles are provided to the magnetic cavity may be proportional to the increase in current in the particle beam.

The particle accelerator may include an RF controller including rotating capacitors to vary the RF voltage. A rotating capacitor may include plates having shapes that are based on a target decrease in RF voltage slope. The particle beam may be output at a FLASH dose such as a dose that exceeds twenty (20) Gray-per-second for a duration of less than five (5) seconds.

An example particle therapy system includes the foregoing particle accelerator and a gantry configured to enable output of the particle beam to a patient. The gantry may include a conduit to transport the particle beam. The conduit may include a magnetic dipole configured to bend the particle beam by at least 90° towards the patient. The magnetic dipole may be mounted for rotation around the gantry. The magnetic dipole may be configured to bend the particle beam by at least 90° in a presence of a magnetic field of at least 3 Tesla (T).

An example system includes a particle source to provide particles to a magnetic cavity; circuitry to provide a radio frequency (RF) voltage to the magnetic cavity to accelerate particles from the ionized plasma in orbits in the magnetic cavity; a control system to control the particle source to provide the particles to the magnetic cavity based on a slope of the RF voltage; and an extraction channel to receive the particles from the magnetic cavity for output as a particle beam from the particle accelerator. The example system may include one or more of the following features, either alone or in combination.

The control system may be configured to control the particle source to provide the particles to the magnetic cavity at or near a top of a waveform comprising the RF voltage. The system may include a comparator circuit to identify a location at or near the top of the waveform representing the RF voltage. The control system may be configured to control the particle source to provide the particles to the magnetic cavity during an RF voltage having a first waveform generated for an injection cycle that has increased waveform widths relative to a second waveform generated for an acceleration cycle. The control system may be configured to control the particle source to provide the particles to the magnetic cavity at or near a top of a waveform generated for an injection cycle. The waveform generated for the injection cycle may have increased waveform width relative to a waveform generated for an acceleration cycle.

The particle beam may be output at a FLASH dose. The particle beam may be output at a dose that exceeds twenty (20) Gray-per-second for a duration of less than five (5) seconds. The system may include a gantry configured to enable output of the particle beam to a patient. The gantry may include a conduit to transport the particle beam. The conduit may include a magnetic dipole configured to bend the particle beam by at least 90° towards the patient. The magnetic dipole may be mounted for rotation around the gantry. The magnetic dipole may be configured to bend the particle beam by at least 90° in a presence of a magnetic field of at least 3 Tesla (T).

An example particle source includes a tube to introduce gas into a region where particles are to be accelerated, where the tube has an opening through which particles are discharged into the region; electrodes on different ends of the tube for applying an electrical potential to ionize the gas and thereby produce the particles: and a valve that is controllable to allow, or to prevent, the gas from reaching the opening. The particle source may include one or more of the following features, either alone or in combination.

The valve may be within the tube and may be closer to the opening than to either of the electrodes. The valve may include a piezoelectric displacement valve. A pressure of the gas within the tube may be $10^{-4}$ Torr (0.0133322 Pascal (Pa)) or greater. Ionizing the gas may produce plasma in the tube. The plasma may have at least a predefined particle density. The predefined particle density may be $10^{15}$ ions/cm$^3$. The valve may be three centimeters (3 cm) or less from the opening. The valve may be two centimeters (2 cm) or less from the opening. The valve may be between one centimeter (1 cm) and four centimeters (cm) from the opening. The electrodes may include cathodes that are charged periodically, thereby producing electrical pulses that ionize the gas to produce plasma and discharge the particles into the region. The electrical pulses may be produced every millisecond or more for a duration on the order of single-digit microseconds. The tube may be completely separated at the region. The tube may contain an opening at the region but is not completely separated at the region.

An example system includes a particle source to provide particles to a magnetic cavity; circuitry to provide a radio frequency (RF) voltage to the magnetic cavity to accelerate the particles in orbits in the magnetic cavity; and a control system to control the particle source to provide the particles to the magnetic cavity. The particle source includes a tube to introduce gas into a region of the magnetic cavity where particles are to be accelerated, with the tube having an opening through which particles are discharged into the region; electrodes on different sides of the opening for applying an electrical potential to ionize the gas and thereby produce the particles: and a valve that is controllable to allow, or to prevent, the gas from reaching the opening. The system may include one or more of the following features, either alone or in combination.

The gas in the tube may be under first pressure and the magnetic cavity may be at a second pressure that is less than the first pressure. The valve may be controllable to reduce an effect of the first pressure in the tube on the second pressure in the magnetic cavity. The valve may be controllable to prevent gas from reaching the opening during times when the electrical potential is not applied to the electrodes.

The electrodes may include cathodes that are charged periodically thereby producing electrical pulses that ionize the gas to produce plasma and discharge the particles into the region. The gas in the tube may be under first pressure, and the magnetic cavity may be at a second pressure that is different from (e.g., less than) the first pressure. The valve may be controllable to prevent gas from reaching the opening during at least part of times when the electrical pulses are not produced. The valve may be controllable to allow gas to reach the opening when the electrical potential is applied to the electrodes. The valve may be controllable to allow gas to reach the opening only when the electrical potential is applied to the electrodes and only for a predetermined duration before the electrical potential is applied to the electrodes.

The electrodes may include cathodes that are charged periodically thereby producing electrical pulses that ionize the gas to produce plasma and discharge the particles into the region. The gas in the tube may be under first pressure, and the magnetic cavity is may be a second pressure that is less than the first pressure. The valve may be controllable to allow gas to reach the opening during times when the electrical pulses are produced. The valve may be controllable to allow gas to reach the opening only during times when the electrical pulses are produced and only for a predetermined duration before the electrical pulses are produced. The valve may be in the tube and closer to the opening than to either of the electrodes. The valve may include a piezoelectric displacement valve.

Any two or more of the features described in this specification, including in this summary section, may be combined to form implementations not specifically described in this specification.

Control of the various systems described herein, or portions thereof, may be implemented via a computer program product that includes instructions that are stored on one or more non-transitory machine-readable storage media and that are executable on one or more processing devices (e.g., microprocessor(s), application-specified integrated circuit (s), programmed logic such as field programmable gate array(s), or the like). The systems described herein, or portions thereof, may be implemented as an apparatus, method, or a medical system that may include one or more processing devices and computer memory to store executable instructions to implement control of the stated functions. The devices, systems, and/or components described herein may be configured, for example, through design, construction, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example particle therapy systems, and particle accelerators for use therewith, that are configured to generate beam currents and particle beam intensities that may be usable in ultra-high dose rate, or FLASH, particle therapy. In general, the systems and accelerators described herein are controllable to increase the amount—for example, the number—of protons or ions (referred to generally as "particles") injected into the particle accelerator in order to affect, e.g., to increase, beam current. In some implementations, the systems are configured to change a frequency of a radio frequency (RF) voltage provided to the particle accelerator in order to increase the time period during which particles are injected into and accepted by the accelerator. In some implementations, the systems are configured to select a point on the RF waveform that has the smallest or a relatively small slope and to inject particles into the accelerator at that time. The effect is an increase in the time period during which particles are injected into and accepted by the accelerator. The increase in the amount of particles accepted by the accelerator results in an increase in beam current. In some implementations, the systems are configured to regulate the pressure inside the particle accelerator in order to reduce the effects of collisional particle loss.

Figure 1:
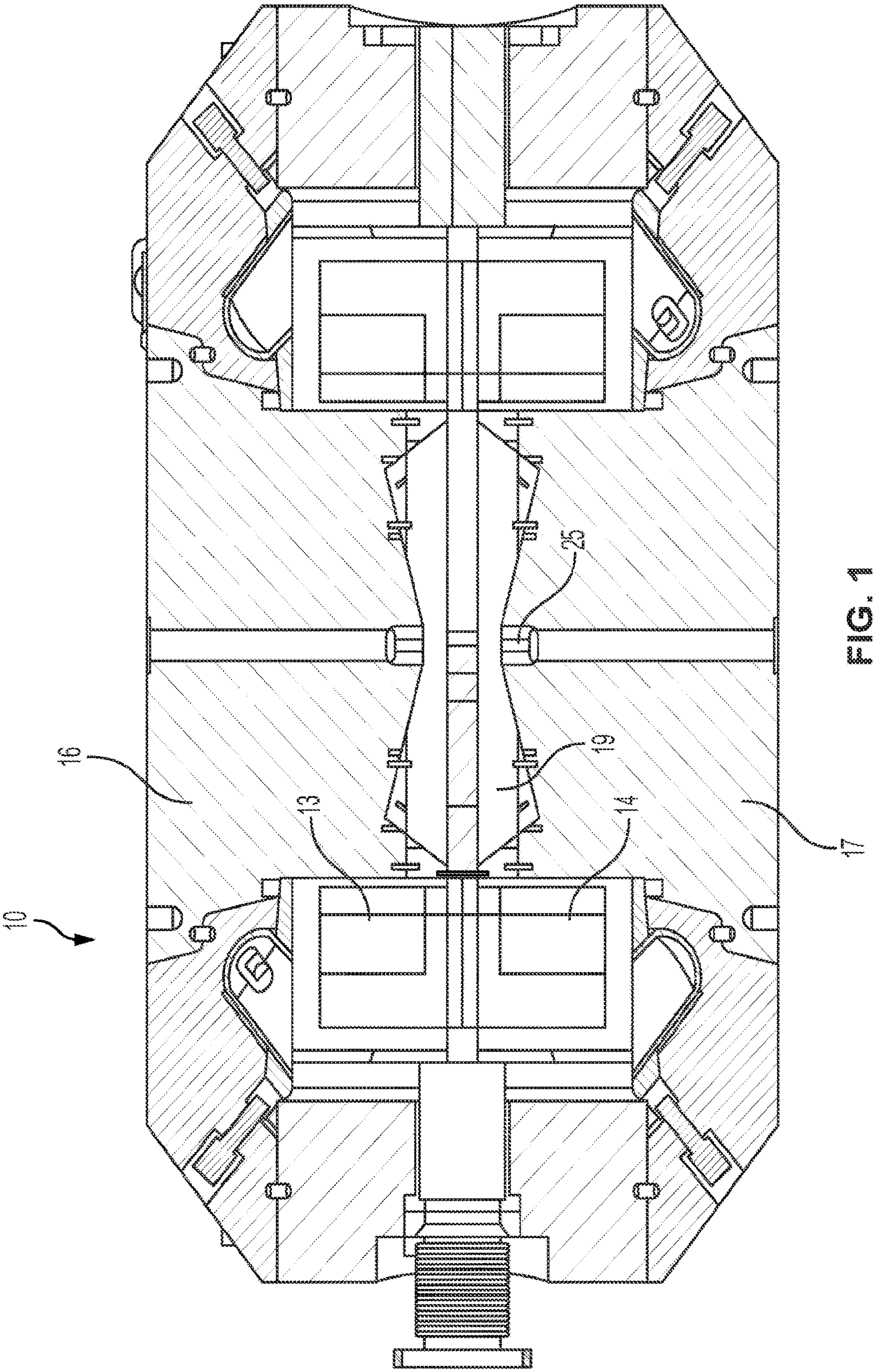
FIG. 1 is a cut-away, side view of components of an example particle accelerator that may be used with the particle therapy system described herein.

FIG. 1 shows a cross-section of components of an example superconducting synchrocyclotron 10 that may be used to provide a particle (e.g., proton) beam in a particle (e.g., proton) therapy system that has one or more features of the type described in the preceding paragraph. In this example, the components include a superconducting magnet. The superconducting magnet includes superconducting coils 13 and 14. The superconducting coils are formed of multiple integrated conductors, each of which includes superconducting strands—for example, four strands or six strands—wound around a center strand which may itself be superconducting or non-superconducting. Each of the superconducting coils 13, 14 is for conducting a current that generates a magnetic field (B). The magnetic yokes 16, 17 or smaller magnetic pole pieces shape that magnetic field in a magnetic cavity (referred to herein as "cavity") 19 in which particles are accelerated. In an example, a cryostat (not shown) uses liquid helium (He) to conductively cool each coil to low-temperature superconducting temperatures, e.g., around 4° Kelvin (K).

Figure 2:
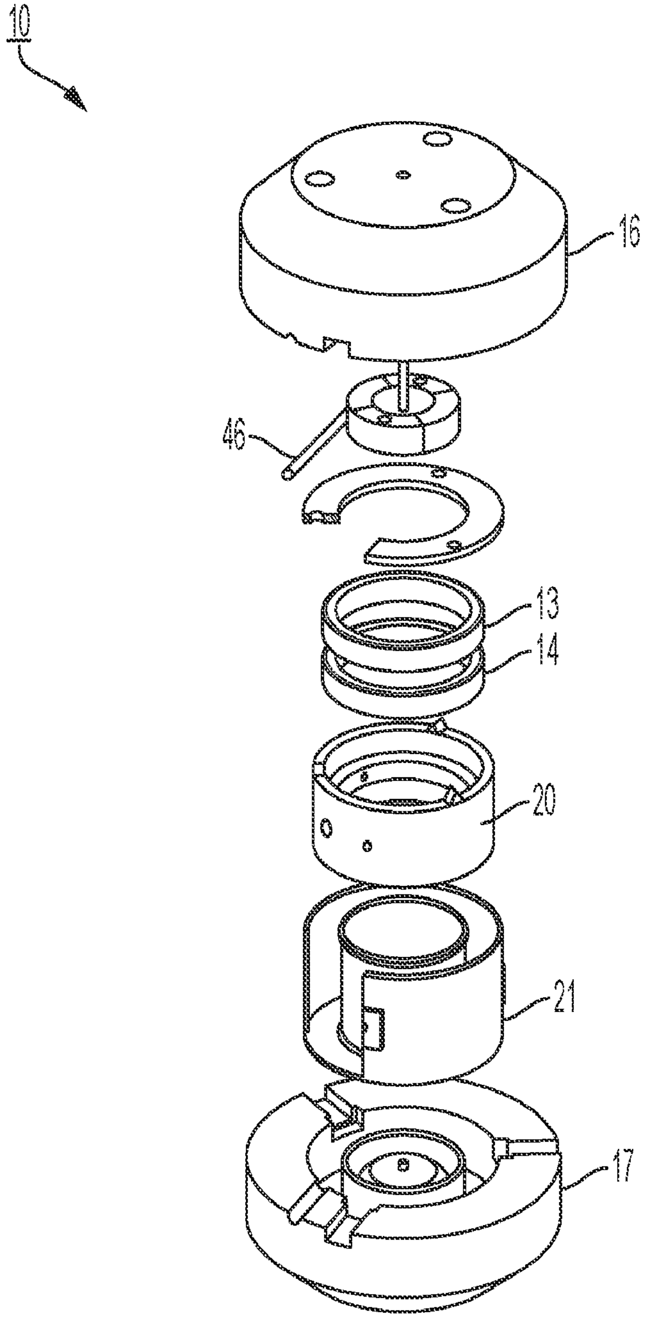
FIG. 2 is an exploded view showing components of the particle accelerator.

As shown in FIG. 2, the two superconducting magnet coils 13, 14 are centered on a common axis and are spaced apart along the axis. The coils may be formed of $Nb_3Sn$-based superconducting strands. The coils are mounted on a reverse stainless steel bobbin 20. The geometry of the coils is maintained by the reverse stainless steel 20, which exerts a restorative force that counteracts the distorting, or hoop, force produced when the coils are energized.

The superconducting coils are maintained at temperatures near absolute zero (e.g., about 4° K) by enclosing the coil assembly (the coils and the bobbin) inside an evacuated annular aluminum or stainless steel cryostat chamber 21 that provides a free space around the coil structure, except at a limited set of support points. The coil assembly and cryostat chambers are mounted within and fully enclosed by magnetic yokes 16 and 17, which collectively may be considered as a single magnetic yoke. The magnetic yoke provides a path for the return magnetic field flux and magnetically shields the volume between the yoke pole faces to prevent external magnetic influences from perturbing the shape of the magnetic field within that cavity. The yoke also serves to decrease the stray magnetic field in the vicinity of the accelerator.

Figure 3:
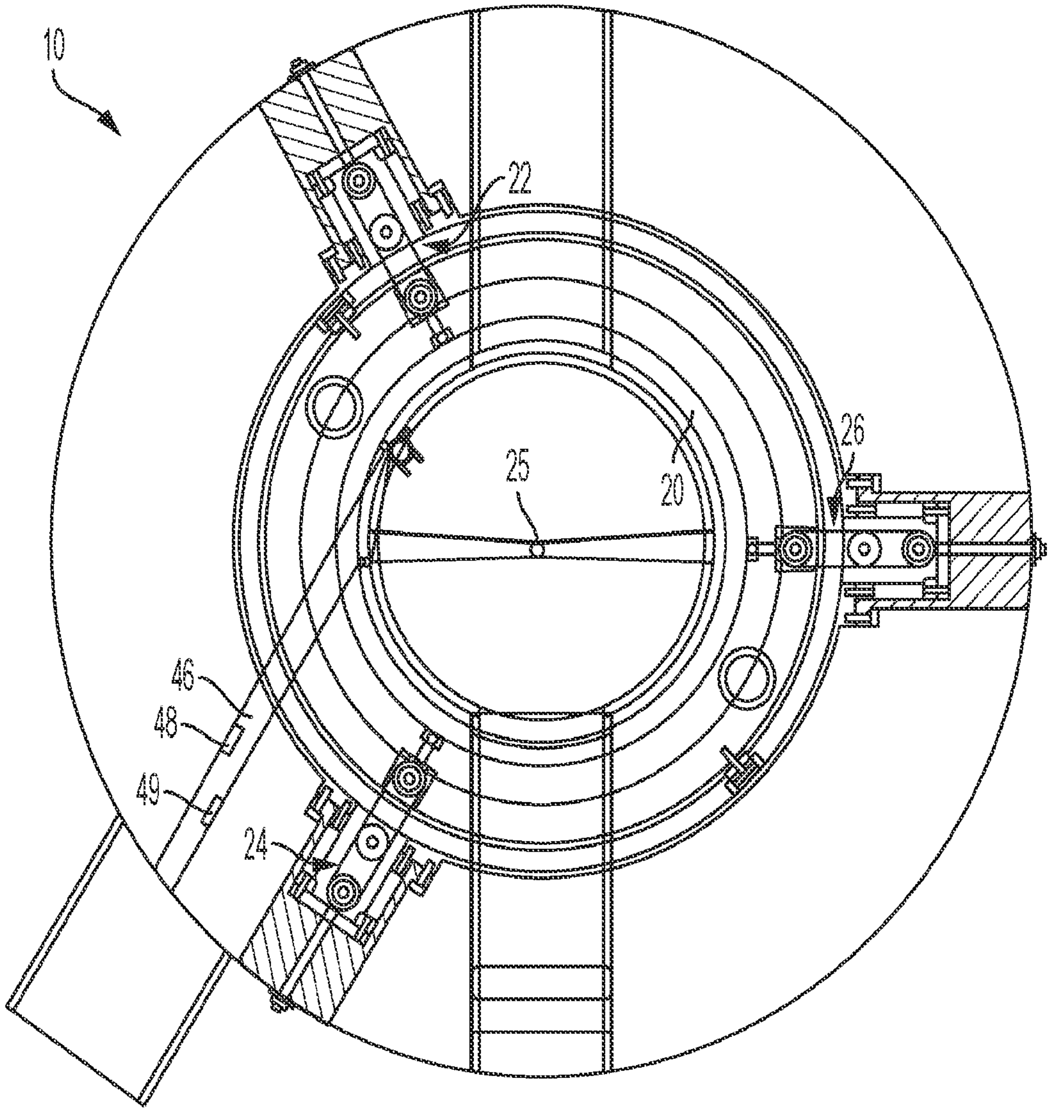
FIG. 3 is a cut-away top view showing components of the particle accelerator.

As shown in FIG. 3, coil position is maintained relative to the magnetic yoke and cryostat using a set of warm-to-cold support straps 22, 24, 26. Supporting the bobbin and coil with straps reduces the heat leakage imparted to the cryostat by a rigid support system. The straps are arranged to withstand varying gravitational force on the coil. They withstand the combined effects of gravity and the large de-centering force realized by coils when they are perturbed from a perfectly symmetric position relative to the magnet yoke. Additionally the straps act to reduce dynamic forces imparted on the coils as the gantry accelerates and decelerates when its position is changed.

In some implementations, such as the implementations shown in FIGS. 1 to 3, a magnetic shield (not shown) surrounds the yokes. The return yokes and the shield together act to reduce stray magnetic fields, thereby reducing the possibility that stray magnetic fields will adversely affect the operation of the particle accelerator.

In some implementations, the return yokes and/or shield may be replaced by, or augmented by, an active return system. An example active return system includes one or more active return coils that conduct current in a direction opposite to current through the main superconducting coils 13, 14. In some implementations, there is an active return coil for each superconducting main coil, e.g., two active return coils—one for each main superconducting coil. Each active return coil may also be a superconducting coil that surrounds the outside of a corresponding main superconducting coil concentrically. In some implementations, the active return coils may be or include non-superconducting coils. By using an active return system, the relatively large ferromagnetic magnetic yokes 16, 17 can be replaced with magnetic pole pieces that are smaller and lighter. Accordingly, the size and weight of the synchrocyclotron can be reduced further without sacrificing performance. An example of an active return system that may be used is described in U.S. Pat. No. 8,791,656 (Zwart) entitled "Active Return System". The content of U.S. Pat. No. 8,791,656, particularly the content related to the return coil configuration (e.g., FIGS. 2, 4, and 5 of U.S. Pat. No. 8,791,656 and the accompanying description), is incorporated herein by reference.

Another component of the accelerator is the source of particles to be accelerated, called a particle source. For electron accelerators various cathode technologies such as thermionic emitters, field emitters, and photocathodes readily provide a sufficient number of electrons for the beam. These electron sources also add minimal gas loads to the accelerator vacuum system. Proton and other ion accelerators, however, may use more complicated particle sources as the ions cannot be easily removed from a bulk metal the way electrons can. Particle sources can take many forms, including sputtering sources and laser-driven sources. One class of particle sources is the plasma-based particle source. This class of particle sources includes the addition of a source gas containing atoms/molecules to be ionized. The resulting particles are extracted from the plasma and injected into the accelerator.

Figure 4:
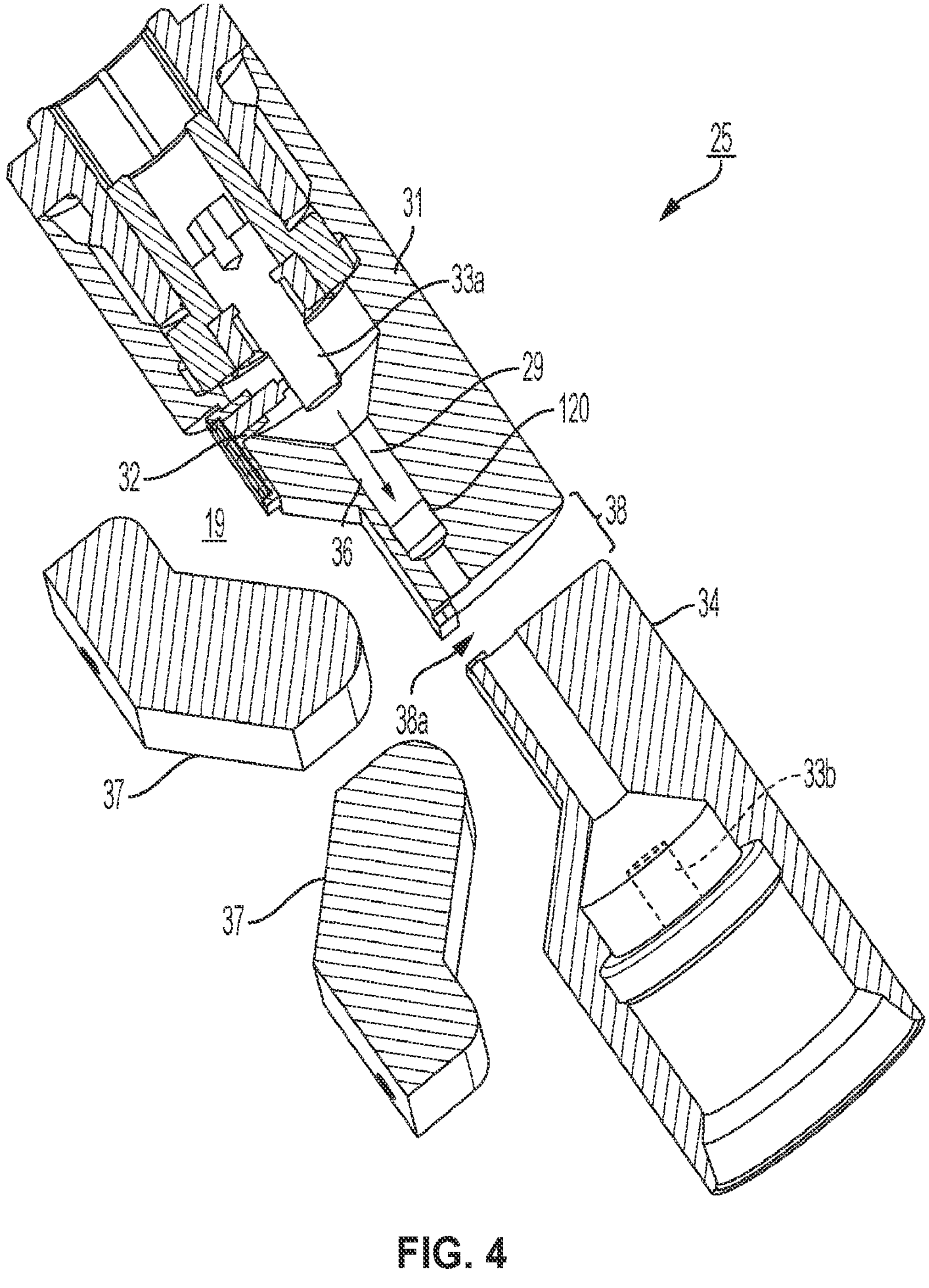
FIG. 4 is a cut-away side view of an example particle source that may be used in the particle accelerator.

An example plasma-based particle source includes particle source 25 of FIGS. 1, 3, and 4. Particle source 25 is a Penning Ion Gauge (PIG) source in this example, and is configured to provide a column of plasma that is at least partially ionized within cavity 19. Referring to FIGS. 1 and 3, particle source 25 is near to the magnetic center of the synchrocyclotron so that particles are present at the synchrocyclotron mid-plane, where they can be acted upon by an RF voltage field as described below.

As noted above, the particle source may have a PIG geometry. In the PIG geometry, two high-voltage electrodes such as cathodes 33*a*, 33*b* (FIG. 4) are arranged at different or opposite ends of the particle source so that they are aligned linearly. For example, one cathode 33*a* may be on one side of acceleration region 38 and the other cathode 33*b* may be on the other side of acceleration region 38 and in line with magnetic field lines within cavity 19. A gas tube 36, which is sometimes referred to as a "chimney", extends toward the acceleration region from each end of the particle source. In implementations where the particle source is not interrupted (see, e.g., FIG. 15 described below), the tube extends through the acceleration region. Particle source 25 includes an emitter side 31 containing a gas feed 32 for receiving the gas and a reflector side 34. Gas is introduced through gas feed 32 and propagates in the direction of arrow 29 to and through tube 36, which holds the gas. When a relatively small amount of a gas, such as hydrogen/$H_2$, occupies a region in the tube between the cathodes, a plasma column may be formed from the gas by applying a voltage to the cathodes. The applied voltage causes electrons to stream along the magnetic field lines, essentially parallel to the tube walls, and to ionize gas molecules that are concentrated inside the tube. The background magnetic field prevents scattering of the ionized gas particles and creates the plasma column between the cathodes.

The gas in gas tube may include a mixture of hydrogen and one or more other gases. For example, the mixture may contain hydrogen and one or more of the noble gases, such as helium, neon, argon, krypton, xenon, and/or radon (although the mixture is not limited to use with the noble gases). In some implementations, the mixture may be a mixture of hydrogen and helium. For example, the mixture may contain about 75% or more of hydrogen and about 25% or less of helium (with possible trace gases included). In another example, the mixture may contain about 90% or more of hydrogen and about 10% or less of helium (with possible trace gases included). In examples, the hydrogen/helium mixture may be any of the following: >95%/<5%, >90%/<10%, >85%/<15%, >80%/<20%, >75%/<20%, and so forth.

As noted above, an example of a particle source 25 having a PIG geometry that may be used in synchrocyclotron 10 is shown in FIG. 4. An example implementation of particle source 25 is also described in U.S. Pat. No. 8,970,137. The content of U.S. Pat. No. 8,791,656, particularly the content related to the interrupted particle source (e.g., FIGS. 3A, 3B, and 4 to 7 of U.S. Pat. No. 8,970,137 and the accompanying descriptions), is incorporated herein by reference.

The particle source may pass through a dummy dee (not shown in FIG. 4) and be adjacent to active (RF) dee 37, which are described below. In operation, the particle source pulses periodically to provide particles (e.g., protons) to cavity 19. The magnetic field between the active dee and the dummy dee causes the particles to accelerate outwardly. The acceleration is spiral to create orbits about the plasma column, with the particle-to-plasma-column radius progressively increasing. The radii of curvature of the spirals depend on a particle's mass, energy imparted to the particle by the RF field, and a strength of the magnetic field. When the magnetic field is high, it can become difficult to impart enough energy to a particle so that it has a large enough radius of curvature to clear the physical housing of the particle source on its initial turn(s) during acceleration.

The magnetic field is relatively high in the center region of cavity 19 containing the particle source, e.g., on the order of 2 Tesla (T) or more (e.g., 2.5 T, 3T. 4 T, 5 T, 6 T, 8 T, 8.8 T, 8.9 T, 9 T, 10.5 T, or more). As a result of this relatively high magnetic field, the initial particle-to-ion-source radius is relatively small for low energy particles, where low energy particles include particles that are first drawn from the plasma column. For example, such a radius may be on the order of 1 mm (millimeter). Because the radii are so small, at least initially, some particles may come into contact with the particle source's housing, thereby preventing further outward acceleration of such particles. Accordingly, the housing of particle source 25 may be interrupted, for example, separated to form two parts. That is, a portion of the particle source's housing may be partially or entirely removed at the acceleration region 38, thereby creating an opening 38*a* at about an area where the particles are output from the particle source. The housing may also be removed for distances above and below the acceleration region. For example, the housing may also be removed for single-digit millimeters or single-digit centimeters above and below the acceleration region.

Explained differently, opposed parts of particle source 25 aligned with the axis of rotation of the beam are separated such that tips of the particle source do not reach the acceleration region 38. This design results in a relatively high conductance between the plasma and the cavity (the vacuum space). In an example, the particle source ideally produces plasma having a density of $10^{15}$ ions/$cm^3$ or $10^{15}$ electrons/$cm^3$ (cubic centimeter) or greater. If the pressure in the particle source is too low, the plasma density is too low and the overall beam current is limited by the number of protons than can be extracted from the plasma. The pressure here refers to the pressure of the gas within the particle source. If the pressure in the particle source is too high, the pressure from the particle source can increase the pressure of cavity 19, adversely affecting particle acceleration, as described below. Also, in cases where the pressure in the particle source is too high, there are protons available to be extracted from the plasma, but the overall beam current of the accelerator is limited by collisional losses of these proton due to the background gas from the particle source. This can result in in degraded performance for both the particle accelerator and the particle source.

In this regard, in some examples, plasma-based particle sources such as particle source 25 may operate at pressures at or near $10^{-4}$ Torr (0.0133322 Pascal (Pa)) or greater. In some implementations, particle acceleration and beam transport in cavity 19 works better or best with a negative pressure approaching vacuum, e.g., of $10^{-5}$ Torr (0.0013332 Pascal) or less. As the pressure in cavity 19 increases more above vacuum, scattering of low energy particles in the particle beamline also increases. For a device such as a synchrocyclotron where the particles are injected into the cavity at low energies and accelerated within the same cavity, the high pressure required for a plasma-based particle source has the potential to limit the beam current the synchrocyclotron can produce due to such scattering losses in the beamline.

Thus, the pressure in the particle source (e.g., particle source 25), which is greater than the pressure in cavity 19, may increase the pressure in cavity 19, leading to limitations in the magnitude of the beam current and other undesirable effects, including those described above. To address these issues, particle source 25 is configured and controllable limit the cavity's exposure to pressure in the particle source. To this end, particle source 25 includes a valve 120, such as a fast-pulsed gas valve, that regulates gas flow through the particle source. The valve is controllable to reduce the amount of gas provided to the cavity by reducing the duration that the particle source opening to the cavity is exposed to the gas. Reducing the cavity's exposure to the gas from the particle source reduces the cavity's exposure to pressure in the particle source. As a result, the chances that the pressure in the cavity will increase as a result of exposure to the particle source pressure are also reduced. In an example, the valve is controllable to prevent gas from reaching the particle source opening 38*a* during times when cathode electrical pulses (e.g., electrical potential) are not produced and to allow gas to reach the opening 38*a* when the electrical pulses are produced and applied to the cathodes. The valve is also controllable to allow gas to reach the opening 38*a* for a predefined duration before the electrical pulses are produced and applied to the cathodes. In some cases, the valve is controllable to allow gas to reach the opening 38*a* only during times when the electrical pulses are produced and applied to the cathodes and only for a predetermined duration before the electrical pulses are produced. In these examples, at all other times, gas does not reach the opening 38*a*.

As shown, valve 120 is included in tube 36 that provides the gas to opening 38*a* at the acceleration region. In this example, valve 120 is located in the path of the gas flow toward opening 38*a* and on one side of the opening. When closed, the valve produces a gas-tight seal within tube 36, preventing the flow of gas past the valve. When opened, the valve allows gas to flow through the valve and through the entire length of tubing (including the separation region) between the two cathodes.

In an example, a piezoelectric actuator controls valve 120. When an ion pulse is requested by the control system, the valve opens and allows gas flow into tube 36 to produce a plasma column having the target high plasma density. This enables extraction of a large number of protons per bunch moving through the cavity. Because, in some examples, the valve is only open for the duration of the injection of particles, the amount of gas—called the "gas load"—provided to the cavity by the particle source may be reduced compared sources that allow the gas to flow in the particle source continuously until the accelerator is ready to produce a beam. The reduces the pressure provided to the cavity by the particle source. In some examples, the particle source is effectively active for less than 2% of the time that the accelerator is operational to produce a particle beam. This can result in a reduction pressure in the cavity by more than an order of magnitude relative to accelerators where the particle source is always active and always providing gas and pressure to the cavity.

Figure 14:
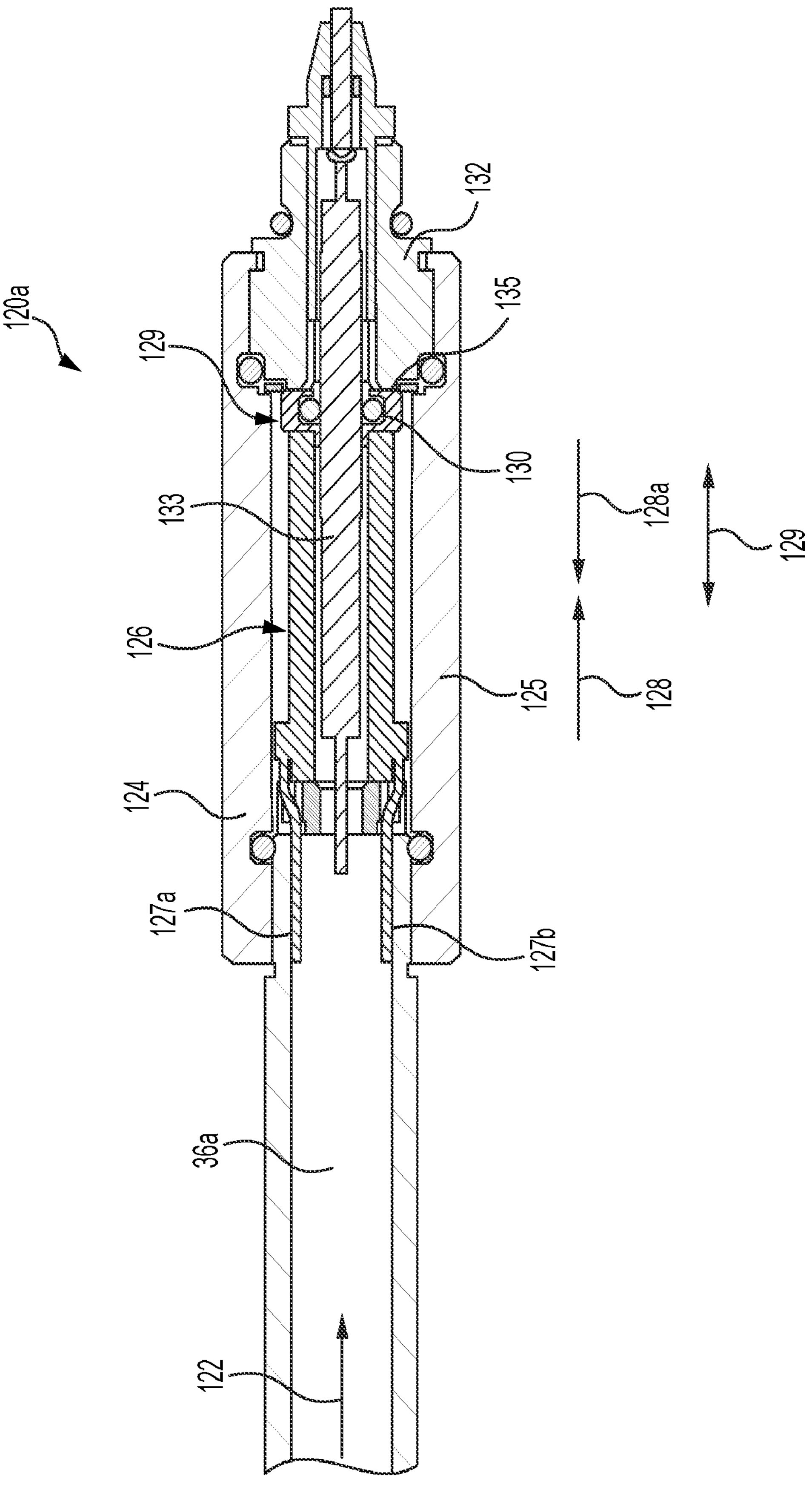
FIG. 14 is a cut-away side view of an example valve that may be used in a particle source to regulate gas flow to the source's opening.

Valve 120 is a piezoelectric displacement valve in this example; however, other types of piezoelectrically-actuated values or electro-mechanical valves may be used. FIG. 14 shows an example of a piezoelectric displacement valve 120*a* that may be used as valve 120 in a particle source such as particle source 25. In this example, valve 120*a* connects to tube 36*a*, which may have the structure and function of tube 36 of FIG. 4, through which gas flows in the particle source toward the particle source opening in the direction of arrow 122. When closed, valve 120*a* creates a gas-tight seal within tube 36*a*; and, when open, valve 120*a* allows gas to flow through the valve and into and towards the acceleration region and particle source opening, such as opening 38*a* of FIG. 4. Valve 120*a* includes a housing 124 containing a region 125 through which the gas passes when valve 120*a* is opened. Valve 120*a* includes a piezoelectric actuator 126 that receives one or more electrical signals through wires 127*a*, 127*b*. In response to these electrical signal(s), piezoelectric actuator 126 contracts, in the directions of arrows 128, 128*a*—for example. Valve 120*a* also includes a torlon seal 129 that is physically connected to piezoelectric actuator 126 and a coaxial seal 130 within the torlon seal. Valve 120*a* includes a region 132 through which gas passes from region 125 to output from valve 120*a* and a stationary wire 133 that may also receive an electrical signal to affect the operation of the piezoelectric actuator 126.

Referring back to FIG. 4, valve 120 may be located closer to opening 38*a* than to either of cathodes 33*a* and 33*b*. By locating valve 120 closer to the opening than to either of the cathodes, the time it takes for the gas to reach opening 38*a* during operation of the particle source—that is, when the valve is opened—may be reduced, enabling the particle source to produce pulses at higher speeds. That is, the gas need not travel as far to reach the opening, enabling operation of the particle source at faster speeds. In an example, valve 120 is three centimeters (3 cm) or less from opening 38*a*. In an example, valve 120 is two centimeters (2 cm) or less from opening 38*a*. In an example, valve 120 is between one centimeter (1 cm) and four centimeters (cm) from opening 38*a*. In general, valve 120 may be at any appropriate distance from opening 38*a*. The location of valve may be based, in part, on its size. That is, the valve should be small enough to fit close to the opening without blocking the opening.

In the example valve of FIG. 14, a control system controls circuitry (not shown) to provide electrical signals to wires 127*a*, 127*b* periodically. The electrical signals coincide with the times that pulses are to be provided by the particle source. For example, the cathodes may be charged periodically, thereby producing electrical pulses that ionize the gas to pulse plasma and discharge particles into cavity 19. The electrical pulses applied to the cathodes may be produced every millisecond or more for a duration on the order of single-digit microseconds (1 μs to 9 μs, although these numbers are only examples). The electrical signals provided to piezoelectric actuator 126 may precede these electrical pulses by a predetermined amount of time, which may be also be measured in single-digit microseconds, to ensure that there is gas at the opening of the particle source when the electrical pulses are applied to the cathodes. The electrical signals provided to piezoelectric actuator 126 also extend for the entire duration of the electrical pulses applied to the cathodes to ensure that gas remains at the opening of the particle source for the whole time that the electrical pulses are applied to the cathodes. In other words, electrical signals are provided to piezoelectric actuator 126 shortly before the electrical pulses are applied to the cathodes in order to open valve 120 so that there is time for gas to pass through the valve and fill the entire tube, including at the opening 38*a*, before the cathodes are pulsed. The valve is controlled to stay open for the entire duration that the cathodes are pulsed so as to ensure that gas remains to produce an ionized plasma column in the particle source. When or shortly after the electrical potential is removed from the cathodes, valve 120*a* is closed by stopping the electrical signals to wires 127*a* and 127*b*.

In this regard, upon application of electrical signal(s) to wires 127*a*, 127*b*, piezoelectric actuator 126 contracts in the direction of arrows 128, 128*a*. This contraction also causes torlon seal 129 and coaxial seal 130 to move in the direction of arrow 128*a*, since they are physically connected to piezoelectric actuator 126 and move along with it. These movements of the various valve components creates a path for gas to travel from region 125, through a gap created at location 135 when the piezoelectric actuator contracts, through region 132, and from there out of valve 120*a* and into the remainder of the particle source tube, including the region containing opening 38*a*. Because actuator 126 is piezoelectrically activated, actuator 126 can operate at speeds on the order of single-digit microseconds, although operation may be slower than that in some implementations. Thus, valve 120*a* is able to open and close on the order of single-digit microseconds, although operation may be slower than that in some implementations. To close valve 120*a*, the electrical signal(s) are removed from wires 127*a*, 127*b*, which causes piezoelectric actuator 126 to expand in the directions of arrows 129. This expansion closes gap 135, thereby preventing the flow of gas out of the valve.

Accordingly, valve 120/120*a* is controllable to reduce the duration that cavity 19 is exposed to the pressure in the tube/particle source, thereby reducing the effect of the pressure in the tube/particle source on the pressure in the cavity. As explained, valve 120/120*a* is controllable to prevent gas from reaching the opening during times when electrical pulses (electrical potential) are not applied to the electrodes and, as a result, pressure from the tube/particle source does not reach the opening during those times and affect—for example, increase—pressure in the cavity.

Figure 15:
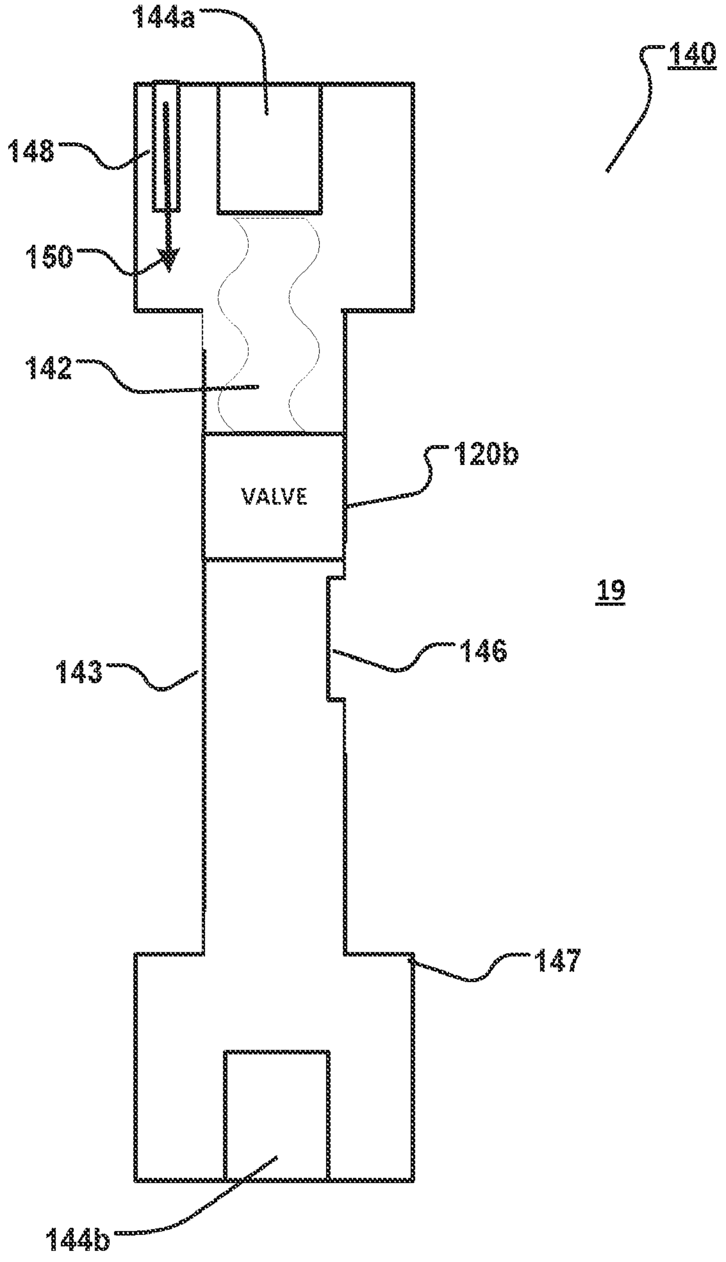
FIG. 15 is a is a cut-away side view of another example particle source that may be used in the particle accelerator.

FIG. 15 shows another example of a particle source 140 that may be used in the particle accelerator described herein, and that may contain a valve, such as valve 120*b*, to control the flow of gas 142 within the particle source's tube (or chimney) 143. Particle source 140 includes cathodes 144*a* and 144*b* at opposite or different ends or parts thereof, which are electrically pulsed to produce partially-ionized plasma from the gas, and a slit 146, which is a type of opening from which pulses of charged particles are discharged into a magnetic such as cavity 19. An anode 147 is at ground potential. Gas is introduced into the particle source via inlet 148 and travels in the direction of arrow 150 to valve 120*b* when it is closed and through valve 120*b* when it is open.

Valve 120*b* is an example implementation of valve 120 of FIG. 4 and may have the structure and function of valve 120 and of valve 120*a* of FIG. 14. Valve 120*b* is arranged and controllable as described herein to control when gas 142 is allowed to reach slit 146. For example, as described above, valve 120*b* is controllable to prevent gas from reaching slit 146 during times when cathode electrical pulses (e.g., electrical potential) are not produced and to allow gas to reach slit 146 when the electrical pulses are produced and applied to the cathodes. The valve is also controllable to allow gas to reach slit 146 for a predefined duration before the electrical pulses are produced and applied to the cathodes. In some cases, the valve is controllable to allow gas to reach slit 146 only during times when the electrical pulses are produced and applied to the cathodes and only for a predetermined duration before the electrical pulses are produced. As described above, the particle source is thus able to output pulses of particles to the cavity while reducing, minimizing, or substantially eliminating the effects of the pressure in the particle source on the pressure in the cavity.

Cavity 19 in which the acceleration occurs encloses the RF dee and dummy dee plates and the particle source and is evacuated by the vacuum pump. Maintaining a high vacuum/very low pressure ensures that accelerating particles are not lost to collisions with gas molecules and enables the RF voltage to be kept at a higher level without arcing to ground. A voltage source provides the RF voltage to cavity 19 to accelerate particles pulsed from the plasma column produced by the particle source. As noted, in an example, the particle accelerator is a synchrocyclotron. Accordingly, the RF voltage is swept across a range of frequencies to account for relativistic effects on the particles, such as increasing particle mass, when accelerating particles within cavity 19. The RF voltage drives an active dee plate (described below) contained within the cavity and has a frequency that is swept downward during the accelerating cycle to account for the increasing relativistic mass of the protons and the decreasing magnetic field. The dummy dee plate acts as a ground reference for the dee plate. The magnetic field produced by running current through the superconducting coils, together with sweeping RF voltage, causes particles from the plasma column to accelerate orbitally within the cavity and to increase in energy as a number of turns increases. The particles in the outermost orbit are directed to an extraction channel described below and are output from the synchrocyclotron as a particle beam. In a synchrocyclotron, the particle beam is pulsed such that bunches of particles are output periodically.

Figure 5:
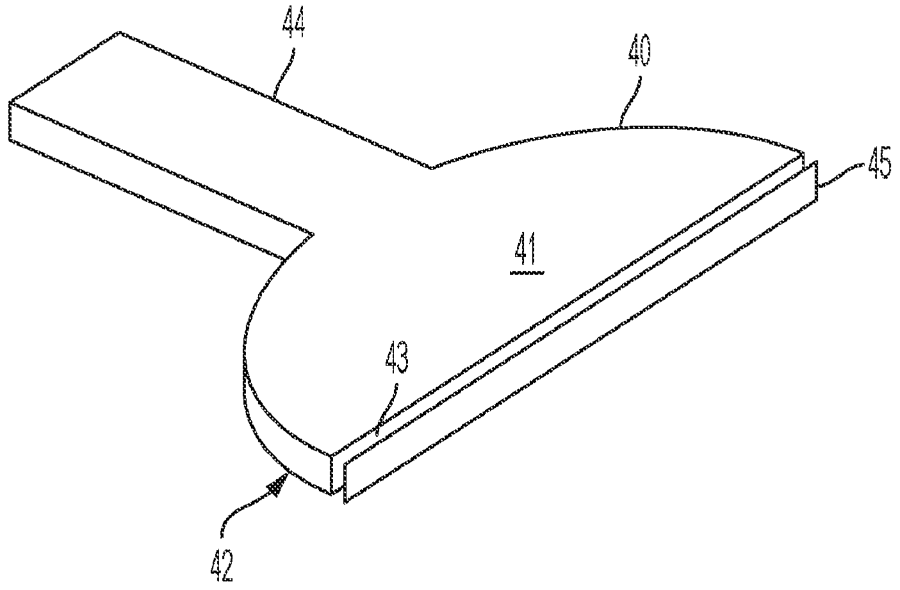
FIG. 5 is a perspective view of example radio frequency (RF) dees that may be used in the particle accelerator.
Figure 13:
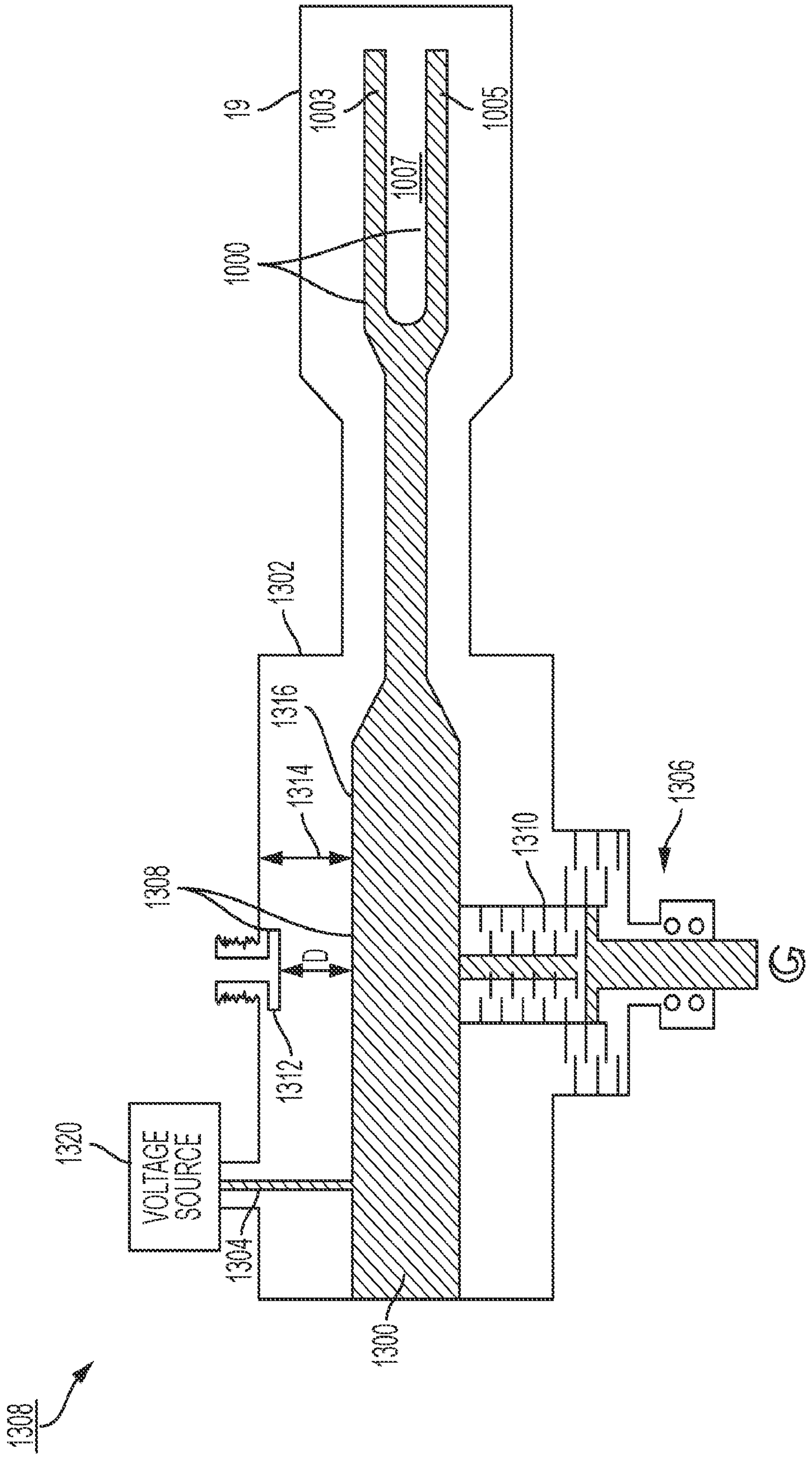
FIG. 13 is a cut-away side view of example components, including circuitry, for controlling the magnitude and waveform of frequency sweeps in the particle accelerator.

In the example of FIGS. 5 and 13, active dee plate 40 (1000 in FIG. 13) is a hollow metal structure that has two semicircular surfaces 41, 42 that enclose a space 43 in which the protons are accelerated during their rotation. A duct 44 opening into the space 43 extends through the yoke to an external location from which a vacuum pump (not shown) can be attached to evacuate the space 43 and the rest of the space within cavity 19 in which the acceleration takes place. In this example, dummy dee 45 includes a rectangular metal ring that is spaced near to the exposed rim of dee plate 40. The dummy dee is grounded to the vacuum chamber and magnet yoke. The dee plate 40 is driven by an RF signal that is applied at the end of a radio-frequency transmission line to impart an electric field in the space 43. The RF signals has a frequency that decreases in time during the particle accelerating cycle as the accelerated particle beam increases in distance from the geometric center of the cavity.

The RF voltage can be tuned to keep the Q-factor of the cavity high during the frequency sweep by using, for example, a rotating capacitor/variable reactive element having intermeshing rotating and stationary blades. During each meshing of the blades caused by the rotation, the capacitance increases, thus lowering the resonant frequency of the cavity. The blades can be shaped to create a precise frequency sweep required. A drive motor for the rotating capacitor can be phase locked to an RF generator for precise control. One bunch of particles is accelerated during each meshing of the blades of the rotating capacitor in this example.

FIG. 13 shows an example capacitive structure 1308, including capacitive circuitry, for controlling the shape of the RF voltage waveform applied to dee plate 1000 (like dee 40) over an RF frequency range. The dummy dee is not shown in FIG. 13. For example, capacitive structure 1308 may be configured and controlled to generate the RF waveforms shown in FIGS. 8, 9, and 10 and variations and/or combinations thereof. The semicircular surfaces 1003, 1005 of the dee plate 1000, which bound a region 1007 of cavity 19 where particles are accelerated, are connected to an inner conductor 1300 and housed in an outer conductor 1302. High voltage is applied to the dee plate 1000 from a voltage source 1320 (e.g., an oscillating voltage input) through a power coupling device 1304 that electrically couples the voltage source to the inner conductor. In some implementations, the coupling device 1304 is positioned on the inner conductor 1300 to provide power transfer from the voltage source to the dee plate 1000. In addition, the dee plate 1000 is coupled to variable reactive elements 1306, 1308 to implement the RF frequency sweep and to change the RF frequency range and waveform shape in response to commands from the control system. For example, the variable reactive element 1306 may be configured and controlled to change the waveform widths 100, 102, 106 of FIGS. 8, 9, and 10, respectively. Variable reactive elements 1308 may be configured and controlled to change the maximum and minimum voltages of the RF voltage, e.g., from those shown in FIGS. 8 and 9 to those shown in FIG. 10.

Variable reactive element 1306 can include one or more rotating capacitors that have multiple blades 1310 that are rotatable using a motor (not shown) that is controlled by the control system. By meshing or unmeshing the blades 1310 during each cycle of an RF sweep, the capacitance of the RF structure changes, which in turn changes the resonant frequency (RF) of cavity 19 and the frequency of the voltage applied to cavity 19. In some implementations, during each quarter cycle of the motor, the blades 1310 mesh with the each other. The capacitance of the RF structure increases and the resonant frequency decreases. The process reverses as the blades 1310 unmesh. As a result, the power required to generate the high voltage applied to the dee plate 1003 and necessary to accelerate the beam can be reduced by a factor. In some implementations, the shape of the blades 1310 is machined to implement dependence of resonant frequency on time.

Blade rotation can be synchronized with RF frequency generation. By varying the Q-factor of cavity 19, the resonant frequency of the RF structure may be kept close to the frequency of the alternating voltage potential applied to dee plate 1003.

Variable reactive element 1308 can be or include a capacitor formed by a plate 1312 and a surface 1316 of inner conductor 1300. The plate 1312 is movable along a direction 1314 towards or away from the surface 1316. The capacitance of the capacitor changes as the distance D between the plate 1312 and the surface 1316 changes. For each different frequency range to be swept in cavity 19 (e.g., to change the minimum and/or maximum frequencies), the distance D is set to a particular value. To change the frequency range to be swept in cavity 19, plate 1312 may be moved corresponding to the change in the frequency range that is desired. The control system may control movement of plate 1312 using a motor (not shown).

In some implementations, inner and outer conductors 1300, 1302 include a metallic material, such as copper, aluminum, or silver. The blades 1310 and the plate 1312 can also include the same or different metallic materials as the conductors 1300, 1302. The coupling device 1304 can be an electrical conductor. The variable reactive elements 1306, 1308 can have other forms and can couple to the dee plate 1000 in other ways to implement the RF frequency sweep and the frequency range variations. In some implementations, a single variable reactive element can be configured to perform the functions of both the variable reactive elements 1306, 1308. In some implementations, more than two variable reactive elements can be used.

Figure 8:
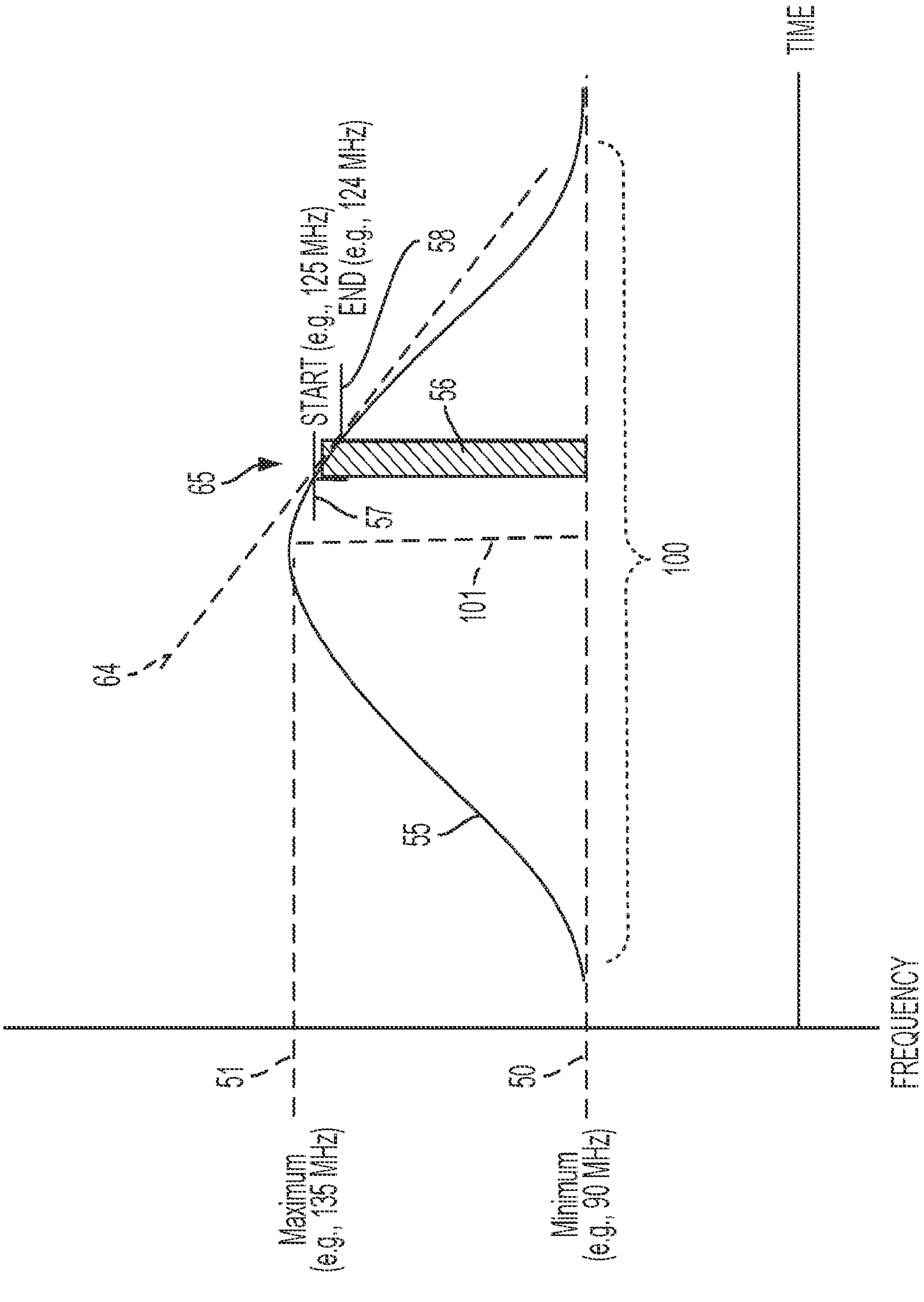
FIG. 8 is a graph showing an RF waveform that may be used during an acceleration cycle in the particle accelerator.

FIG. 8 shows an example change in the RF voltage frequency over time between minimum 50 and maximum 51 frequencies, examples of which are 90 megahertz (MHz) and 135 MHz, respectively. In a typical synchrocyclotron, the RF voltage waveform 55 remains the same when particles are injected into the cavity and when those particles are accelerated within the cavity. That is, the RF voltage waveform remains consistent during the acceleration cycle and the injection cycle, respectively. The acceleration cycle includes when the particles are accelerated within the cavity and the injection cycle includes when the particles are injected into the cavity from the particle source and includes times when the particle source is pulsed, for example. Consistency may be defined in terms of pulse width 100, pulse height 101, or a combination thereof.

Particle source 25 is controllable to provide particles at specific frequencies proximate to a decrease from the maximum RF frequency 51 to the minimum RF frequency 50 during the voltage frequency sweep. For example, as shown FIG. 8, the particle source may be controlled to inject a pulse 56 comprised of particles at any point between a starting frequency 57 and an ending frequency 58. The starting maximum frequency, which is 125 MHz in this example, and the ending minimum frequency, which is 124 MHz in this example, correspond to a range of frequencies over which particles have the greatest likelihood of being accepted into the synchrocyclotron. This range of frequencies is collectively referred to herein as the acceptance frequency. At the acceptance frequency, particles pulsed from the particle source have a high likelihood of acceleration given the magnetic and electric fields in the synchrocyclotron. Acceptance includes the cavity receiving the particles and the RF voltage accelerating the particles within the cavity. Particles injected outside of the acceptance frequency have a lower or low likelihood of acceptance given the magnetic and electric fields in the synchrocyclotron. Accordingly, particle injection during the acceptance frequency is targeted to produce a greater beam current. That is, the more particles that are accepted, the greater will be the density of particles in the resulting beam. A pulse of particles having a width across the entire acceptance frequency is shown in FIG. 8. Other example pulses may not extend across the entire acceptance frequency.

The current extracted from the particle accelerator is based on the amount of particles that are injected into, and accepted by, the cavity. In some examples, the particles can only be successfully injected into the cavity within a few percent or less of the acceptance frequency. Therefore, the time over which particles can be injected into the cavity, and thus the total beam current of the accelerator, is limited by the slope of the frequency variation as a function of time during the particle source pulse. For example, for a synchrocyclotron having a 1% frequency acceptance, an injection frequency of 124-125 MHz and an RF voltage frequency modulation (FM) rate of 0.075 MHz/microsecond (μs), a particle source pulse 56 having a width of 17 μs can be successfully injected into the synchrocyclotron. The duration of this pulse and the pulse repetition rate control the beam current that the synchrocyclotron can produce.

Accordingly, in some implementations, the RF voltage during the injection cycle—that is, at the time the particles are injected into the cavity—can be changed so that its slope is less than the average slope of the RF voltage waveform during the acceleration cycle. In an example, the slope of the RF voltage waveform during the injection cycle may be less than the slope of the RF waveform at the same point along the waveform during the acceleration cycle. A slope that is 25% less at the time of the particle source injection as compared to the average slope during the acceleration cycle may produce 25% more beam current. In other words, a slope that is four times less extends the duration of the acceptance frequency, which enables four times as many particles to be injected during the extended acceptance frequency, resulting in four times more beam current. This lower frequency modulation slope can be implemented by the control system controlling the rate of rotation of the rotating capacitors 1306 (FIG. 13) to provide the desired frequency profile as a function of time. The shape of the leaves may also be configured to affect the frequency.

Figure 9:
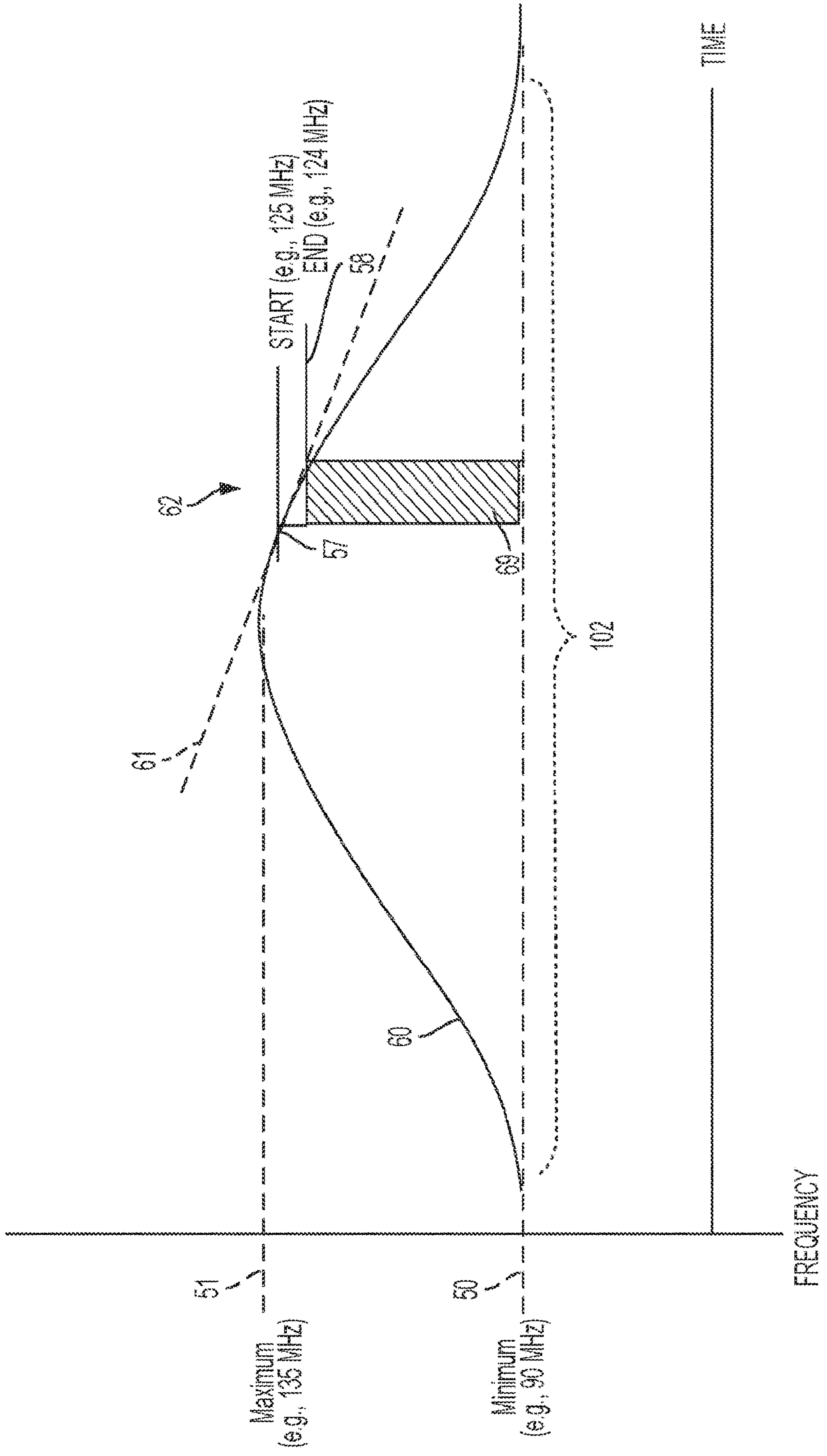
FIG. 9 is a graph showing an RF waveform that may be used during a particle injection cycle in the particle accelerator.

In an example operation of the particle accelerator of FIG. 1, the RF voltage waveform 55 of FIG. 8 is the RF voltage that is provided to cavity 19 during the acceleration cycle. The RF voltage waveform 60 of FIG. 9 is the RF voltage that is provided to cavity 19 during the injection cycle. As shown, the width 102 of waveform 60 is increased relative to width 100 of waveform 55. For example, the width of waveform 60 may be twice as large as the width of waveform 55, three times as large, four times as large, and so forth. Consequently, the slope 61 of waveform 60 at the acceptance frequency 124-125 MHz during particle injection 62 is less than the slope 64 of waveform 55 (FIG. 8) the acceptance frequency 124-125 MHz during particle injection 65. As a result, the amount of particles that may be injected, as represented by pulse 69 (FIG. 9), is greater during the RF frequency sweep of FIG. 9 than it is during the RF frequency sweep of FIG. 8 (represented by pulse 56 in FIG. 8). That is, in both examples, the particles are injected between 125 MHz and 124 MHz; however, since the time period between 125 MHz and 124 MHz is greater in waveform 60 than in waveform 55, more particles may be injected using waveform 60. As a result, the beam current is increased by using waveform 60 during the injection cycle. Waveform 55 may continue to be used during the acceleration cycle. The rotating capacitors 1306/1310 described herein may be controlled to switch between waveforms 55 and 60 at appropriate times based, for example, on the pulse timing of the particle source. For example, when electrical potential is applied to the particle source cathodes, the rotating capacitors described herein may be controlled to switch from waveform 55 to waveform 60.

In some implementations, a reduction in slope from RF voltage waveform 55 to RF voltage waveform 60 is proportional to an increase in current in the particle beam. In some implementations, the slope of the RF voltage waveform during the injection cycle is at least 75% less than the slope of the RF voltage waveform during the acceleration cycle. In some implementations, the slope of the RF voltage waveform during the injection cycle is at least 50% less than the slope of the RF voltage waveform during the acceleration cycle. In some implementations, the slope of the RF voltage waveform during the injection cycle is at least 30% less than the slope of the RF voltage waveform during the acceleration cycle. In some implementations, the slope of the RF voltage waveform during the injection cycle is at least 25% less than the slope of the RF voltage waveform during the acceleration cycle. In some implementations, the slope of the RF voltage waveform during the injection cycle is at least 20% less than the slope of the RF voltage waveform during the acceleration cycle. In general, the slope of the RF voltage waveform during the injection cycle may be any appropriate percentage less than the slope of the RF voltage waveform during the acceleration cycle.

Figure 10:
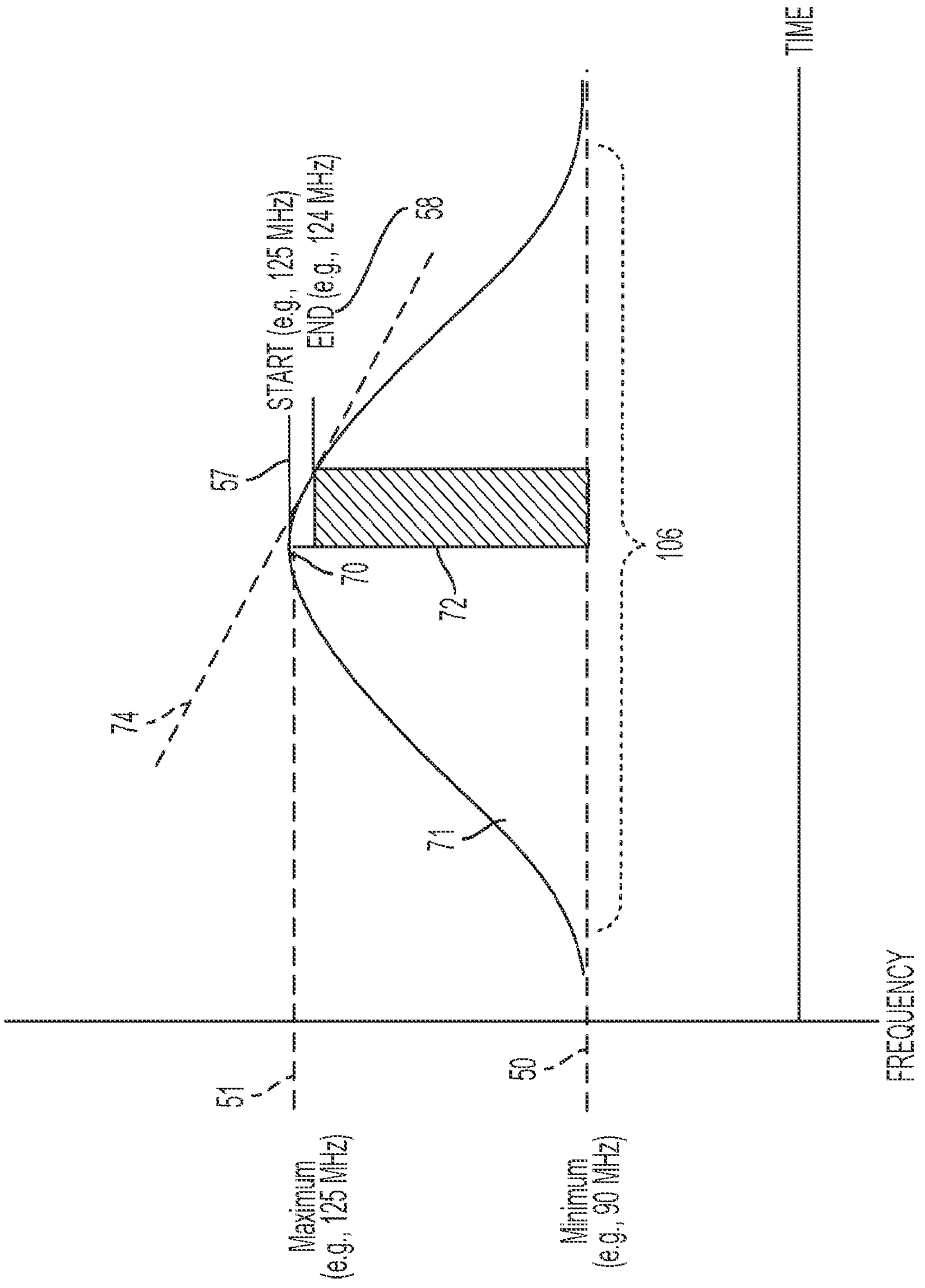
FIG. 10 is a graph showing an RF waveform that may be used during a particle injection cycle in the particle accelerator.

In some implementations, particle source timing triggers can be used that are generated using one or more frequency comparators. By using one or more frequency comparators (which may use a minimum frequency slope for reliable operation) and timing delays, a particle source trigger can be initiated at any point in the RF voltage waveform including at or near the top of the waveform where the slope is lower than at other points along the waveform. For example, referring to FIG. 10, by controlling the operation of and/or shape of capacitors (e.g., 1308), RF voltage waveform may be generated so that the beginning of the acceptance frequency (e.g., 125 MHZ) is at or near the top 70 of RF waveform 71, where the slope is less than at other parts of the waveform. For example, the acceptance frequency may begin at the top of the waveform or at 5% from the top on the downslope, 10% from the top on the downslope, or at any appropriate percentage from the top on the downslope. In the implementation of FIG. 10, the amount of particles that may be extracted, as represented by pulse 72, is greater that it would be at other locations of the waveform where the slope 74 is greater. As a result, the beam current is increased. In some implementations, waveform 71 may be used during the injection cycle and waveform 55 of FIG. 8 may be used during the acceleration cycle. In some implementations, waveform 71 may be used during both the injection and acceleration cycles. In some implementations, the width 106 of waveform 71 may be increased like that of waveform 60 (relative to the waveform used during the acceleration cycle), further increasing the duration of the acceptance frequency and the amount of particles that can be injected at that time.

Figure 11:
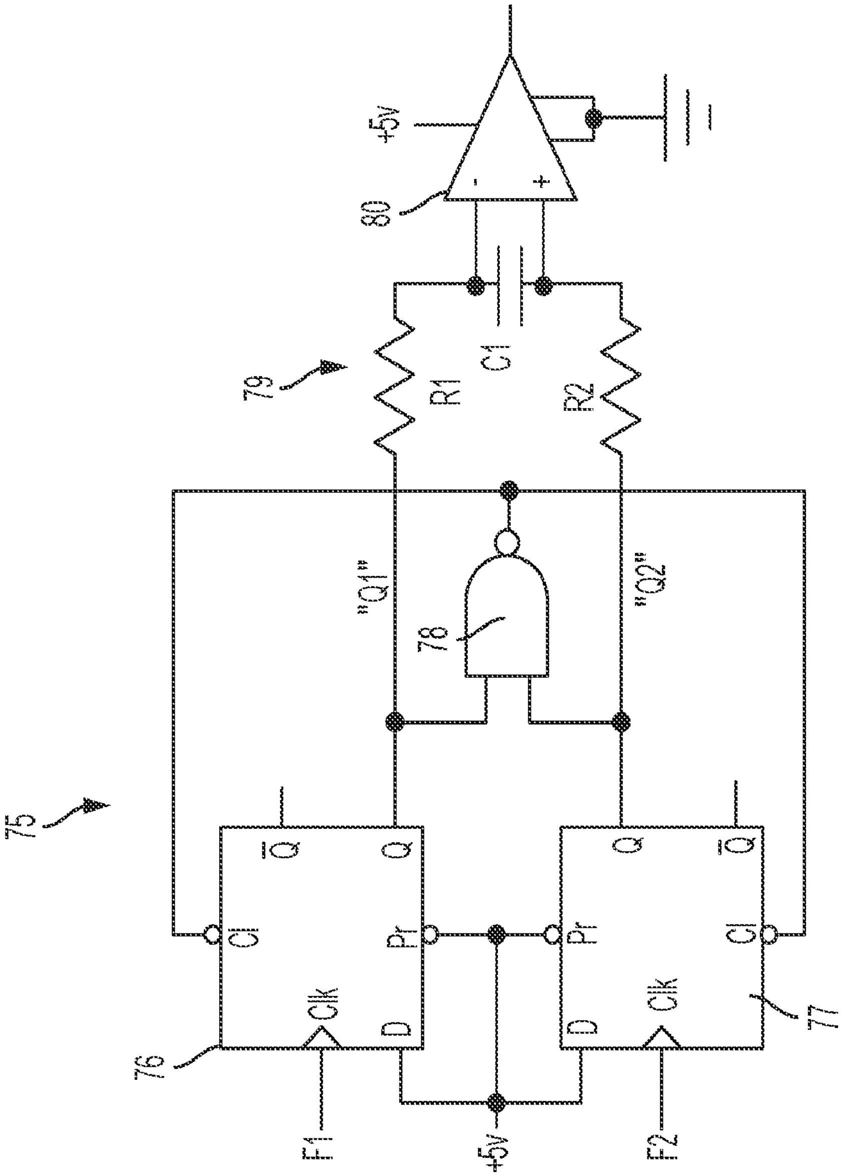
FIG. 11 is a circuit diagram of an example comparator circuit.

FIG. 11 shows an example of an example comparator circuit 75 that may be used to identify locations at or near the top of a voltage waveform in order to identify the start or end of the acceptance frequency. Other types of frequency comparators may be used to perform this function. In this example, individual RF voltage values—for example, from waveform 71 of FIG. 10—may be sampled and digitized to produce a first pulse train having frequencies F1, which may be compared to a reference pulse train having a frequency F2. F2 may be a reference frequency that is near the maximum frequency of the RF waveform. The two pulse trains are provided to D flip-flops 76 and 77. Outputs of flip-flops 76 and 77, signals Q1 and Q2 respectively, are applied NAND gate 78. NAND gate 78 outputs control whether to reset flip-flops 76 and 77. Signals Q1 and Q2 are provided to a low-pass filter 79 that includes a capacitor and two resistors, and their resulting filtered values are compared using by an analog comparator 80. The output of frequency comparator 75 can determine a predefined point along an RF voltage waveform, such as the top or near the top, based on comparisons performed using signals Q1 and Q2. That is, frequencies at which Q1 exceed Q2 correspond to locations at or near the top of the RF voltage waveform.

Referring back to FIG. 1, the magnetic field in cavity 19 is shaped to cause particles to move orbitally within the cavity as described above. The example synchrocyclotron employs a magnetic field that is uniform in rotation angle and falls off in strength with increasing radius. In some implementations, the maximum magnetic field produced by the superconducting (main) coils may be within the range of 2.5 T to 20 T at a center of the cavity, which falls off with increasing radius. For example, the superconducting coils may be used in generating magnetic fields at, or that exceed, one or more of the following magnitudes: 2.5 T, 3.0 T, 3.1 T, 3.2 T, 3.3 T, 3.4 T, 3.5 T, 3.6 T, 3.7 T, 3.8 T, 3.9 T, 4.0 T, 4.1 T, 4.2 T, 4.3 T, 4.4 T, 4.5 T, 4.6 T, 4.7 T, 4.8 T, 4.9 T, 5.0 T, 5.1 T, 5.2 T, 5.3 T, 5.4 T, 5.5 T, 5.6 T, 5.7 T, 5.8 T, 5.9 T, 6.0 T, 6.1 T, 6.2 T, 6.3 T, 6.4 T, 6.5 T, 6.6 T, 6.7 T, 6.8 T, 6.9 T, 7.0 T, 7.1 T, 7.2 T, 7.3 T, 7.4 T, 7.5 T, 7.6 T, 7.7 T, 7.8 T, 7.9 T, 8.0 T, 8.1 T, 8.2 T, 8.3 T, 8.4 T, 8.5 T, 8.6 T, 8.7 T, 8.8 T, 8.9 T, 9.0 T, 9.1 T, 9.2 T, 9.3 T, 9.4 T, 9.5 T, 9.6 T, 9.7 T, 9.8 T, 9.9 T, 10.0 T, 10.1 T, 10.2 T, 10.3 T, 10.4 T, 10.5 T, 10.6 T, 10.7 T, 10.8 T, 10.9 T, 11.0 T, 11.1 T, 11.2 T, 11.3 T, 11.4 T, 11.5 T, 11.6 T, 11.7 T, 11.8 T, 11.9 T, 12.0 T, 12.1 T, 12.2 T, 12.3 T, 12.4 T, 12.5 T, 12.6 T, 12.7 T, 12.8 T, 12.9 T, 13.0 T, 13.1 T, 13.2 T, 13.3 T, 13.4 T, 13.5 T, 13.6 T, 13.7 T, 13.8 T, 13.9 T, 14.0 T, 14.1 T, 14.2 T, 14.3 T, 14.4 T, 14.5 T, 14.6 T, 14.7 T, 14.8 T, 14.9 T, 15.0 T, 15.1 T, 15.2 T, 15.3 T, 15.4 T, 15.5 T, 15.6 T, 15.7 T, 15.8 T, 15.9 T, 16.0 T, 16.1 T, 16.2 T, 16.3 T, 16.4 T, 16.5 T, 16.6 T, 16.7 T, 16.8 T, 16.9 T, 17.0 T, 17.1 T, 17.2 T, 17.3 T, 17.4 T, 17.5 T, 17.6 T, 17.7 T, 17.8 T, 17.9 T, 18.0 T, 18.1 T, 18.2 T, 18.3 T, 18.4 T, 18.5 T, 18.6 T, 18.7 T, 18.8 T, 18.9 T, 19.0 T, 19.1 T, 19.2 T, 19.3 T, 19.4 T, 19.5 T, 19.6 T, 19.7 T, 19.8 T, 19.9 T, 20.0 T, 20.1 T, 20.2 T, 20.3 T, 20.4 T, 20.5 T, 20.6 T, 20.7 T, 20.8 T, 20.9

T, or more. Furthermore, the superconducting coils may be used in generating magnetic fields that are outside the range of 2.5 T to 20 T or that are within the range of 3 T to 20 T but that are not specifically listed herein.

By generating a high magnetic field having a magnitude such as those described above, the bend radius of particles orbiting within cavity 19 can be reduced. As a result of the reduction in the bend radius, a greater number of particle orbits can be made within a given-sized cavity. So, a greater number of orbits can be fit within a smaller cavity. Reducing the size of the cavity reduces the size of the particle accelerator in general, since a smaller cavity requires smaller magnetic yokes or pole pieces, among other components. In some implementations, the size or volume of the particle accelerator may be 4 $m^3$ (cubic meters) or less, 3 $m^3$ or less, or 2 $m^3$ or less.

Particles traverse a generally spiral orbital path beginning at the particle source. In half of each loop of the spiral path, the protons gain energy as they pass through the RF electric field in space 43. As the particle gain energy, the radius of the central orbit of each successive loop of their spiral path is larger than the prior loop until the loop radius reaches the maximum radius of the pole face. At that location a magnetic and electric field perturbation directs the particles into an area where the magnetic field rapidly decreases, and the particles depart the area of the high magnetic field and are directed through an evacuated tube 46 (FIGS. 2 and 3), referred to herein as the extraction channel, to exit the yoke of the particle accelerator. A magnetic regenerator may be used to change the magnetic field perturbation to direct the particle. The particles exiting the particle accelerator will tend to disperse as they enter the area of markedly decreased magnetic field that exists in the room around the particle accelerator. Beam shaping elements 48, 49 in the extraction channel 46 redirect the particle accelerator so that they stay in a straight beam of limited spatial extent.

As the beam exits the extraction channel it is passed through a beam formation system, examples of which are described below with respect to FIG. 6, that can be programmably controlled to create a desired combination of scanning, scattering, and/or range modulation for the output particle beam.

Ultra-high dose rate FLASH therapy may require higher average and instantaneous beam currents than non-FLASH applications. These higher average and instantaneous beam currents may be achieved using the techniques described herein. The particle accelerators, therapy system, and their variations described herein may be configured and controlled to apply ultra-high dose rates of radiation, such as FLASH rates, to an irradiation target in a patient. In this regard, experimental results in radiation therapy have shown an improvement in the condition of healthy tissue subjected to radiation when the treatment dose is delivered at ultra-high (FLASH) dose rates. In an example, when delivering doses of radiation at 10 to 20 Gray (Gy) in pulses of less than 500 milliseconds (ms) reaching effective dose rates of 20 to 100 Gray-per-second (Gy/S), healthy tissue experiences less damage than when irradiated with the same dose over a longer time scale, while tumors are treated with similar effectiveness. A theory that may explain this "FLASH effect" is based on the fact that radiation damage to tissue is proportionate to oxygen supply in the tissue. In healthy tissue, the ultra-high dose rate radicalizes the oxygen only once, as opposed to dose applications that radicalize the oxygen multiple times over a longer timescale. This may lead to less damage in the healthy tissue using the ultra-high dose rate.

In some examples, as noted above, ultra-high dose rates of radiation may include doses of radiation that exceed 1 Gray-per-second for a duration of less than 500 ms. In some examples, ultra-high dose rates of radiation may include doses of radiation that exceed 1 Gray-per-second for a duration that is between 10 ms and 5 s. In some examples, ultra-high dose rates of radiation may include doses of radiation that exceed 1 Gray-per-second for a duration that is less than 5 s.

In some examples, ultra-high dose rates of radiation include doses of radiation that exceed one of the following doses for a duration of less than 500 ms: 2 Gray-per-second, 3 Gray-per-second, 4 Gray-per-second, 5 Gray-per-second, 6 Gray-per-second, 7 Gray-per-second, 8 Gray-per-second, 9 Gray-per-second, 10 Gray-per-second, 11 Gray-per-second, 12 Gray-per-second, 13 Gray-per-second, 14 Gray-per-second, 15 Gray-per-second, 16 Gray-per-second, 17 Gray-per-second, 18 Gray-per-second, 19 Gray-per-second, 20 Gray-per-second, 30 Gray-per-second, 40 Gray-per-second, 50 Gray-per-second, 60 Gray-per-second, 70 Gray-per-second, 80 Gray-per-second, 90 Gray-per-second, or 100 Gray-per-second. In some examples, ultra-high dose rates of radiation include doses of radiation that exceed one of the following doses for a duration that is between 10 ms and 5 s: 2 Gray-per-second, 3 Gray-per-second, 4 Gray-per-second, 5 Gray-per-second, 6 Gray-per-second, 7 Gray-per-second, 8 Gray-per-second, 9 Gray-per-second, 10 Gray-per-second, 11 Gray-per-second, 12 Gray-per-second, 13 Gray-per-second, 14 Gray-per-second, 15 Gray-per-second, 16 Gray-per-second, 17 Gray-per-second, 18 Gray-per-second, 19 Gray-per-second, 20 Gray-per-second, 30 Gray-per-second, 40 Gray-per-second, 50 Gray-per-second, 60 Gray-per-second, 70 Gray-per-second, 80 Gray-per-second, 90 Gray-per-second, or 100 Gray-per-second. In some examples, ultra-high dose rates of radiation include doses of radiation that exceed one of the following doses for a duration that is less than 5 s: 2 Gray-per-second, 3 Gray-per-second, 4 Gray-per-second, 5 Gray-per-second, 6 Gray-per-second, 7 Gray-per-second, 8 Gray-per-second, 9 Gray-per-second, 10 Gray-per-second, 11 Gray-per-second, 12 Gray-per-second, 13 Gray-per-second, 14 Gray-per-second, 15 Gray-per-second, 16 Gray-per-second, 17 Gray-per-second, 18 Gray-per-second, 19 Gray-per-second, 20 Gray-per-second, 30 Gray-per-second, 40 Gray-per-second, 50 Gray-per-second, 60 Gray-per-second, 70 Gray-per-second, 80 Gray-per-second, 90 Gray-per-second, or 100 Gray-per-second.

In some examples, ultra-high dose rates of radiation include doses of radiation that exceed one or more of the following doses for a duration of less than 500 ms, for a duration that is between 10 ms and 5 s, or for a duration that is less than 5 s: 100 Gray-per-second, 200 Gray-per-second, 300 Gray-per-second, 400 Gray-per-second, or 500 Gray-per-second.

In some examples, ultra-high dose rates of radiation include doses of radiation that are between 20 Gray-per-second and 100 Gray-per-second for a duration of less than 500 ms. In some examples, ultra-high dose rates of radiation include doses of radiation that are between 20 Gray-per-second and 100 Gray-per-second for a duration that is between 10 ms and 5 s. In some examples, ultra-high dose rates of radiation include doses of radiation that are between 20 Gray-per-second and 100 Gray-per-second for a duration that is less than 5 s. In some examples, ultra-high dose rate rates of radiation include doses of radiation that are between 40 Gray-per-second and 120 Gray-per-second for a time period such as less than 5 s. Other examples of the time period are those provided above.

Figure 6:
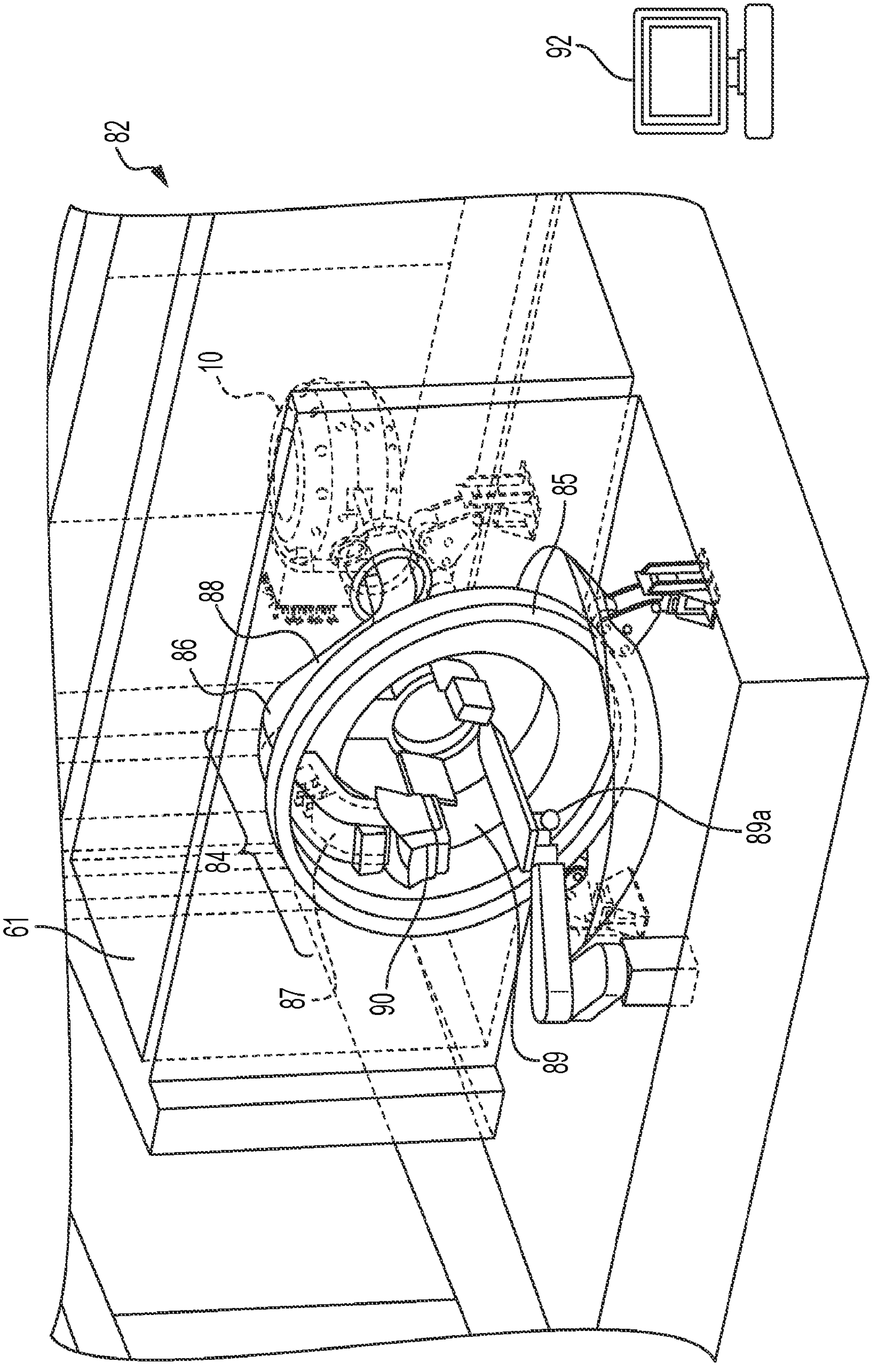
FIG. 6 is a perspective view of an example particle therapy system that may include the particle accelerator.

Referring to FIG. 6, an example particle therapy system 82 that uses the accelerator and techniques described herein includes a gantry 84. Gantry 84 includes ring-shaped or circular support structure 85 and a beamline structure 86. The combination of support structure 85 and beamline structure 86 may be referred to as a "compact gantry" due to its relatively small size. Beamline structure 86 includes an output channel 87 that mounts to support structure 85 and a conduit 88 that directs the particle beam from particle accelerator 10 to the output channel. Gantry 84 also includes one or more motors (not shown) for moving output channel 87 around support structure 85 relative to a treatment position 89. The treatment position may include a system isocenter where a patient may be positioned for treatment. In an example, the motors may move output channel 87 along a track on structure 85 resulting in rotation of output channel 87 relative to treatment position 89. In an example, a structure to which output channel 87 is attached may rotate relative to treatment position 89 at couch 89*a*, resulting in rotation of output channel 87 relative to the treatment position. In some implementations, the rotation enabled by gantry 84 allows output channel 87 to be positioned at any angle relative to the treatment position. For example, output channel 87 may rotate through 360° and, as such, output channel 87 may be positioned at 0°, 90°, 270°, and back to 0°/360° or any angle among these rotational positions. As noted previously, beamline structure 86 is configured to direct a particle beam from accelerator 10 to treatment position 89. To this end, output channel 87 includes magnetics to bend the particle beam towards the treatment position. In addition, beamline structure 86 includes conduit 88 containing magnetics along the beamline that direct the particle beam from particle accelerator 10 to output channel 87.

The output channel includes magnetic dipoles arranged in series to bend the particle beam by at least 90°. The magnetic dipoles may include at least a first magnetic dipole and a second magnetic dipole. The magnetics in the output channel may be configured to bend the particle beam by at least 90° towards an irradiation target in a presence of a magnetic field of at least 3 Tesla (T). In some examples, the output channel includes magnetics to bend the particle beam by more than 90° towards the irradiation target, such as 100°, 110°, 120°, or more.

A beam shaping system, which may include one or more scanning magnets, a range shifter comprised of multiple plates that are movable into and out of the path of the particle beam, and a configurable collimator may be included in nozzle 90. In some implementations, one or more of the scanning magnets may be included in the beamline structure 86 and/or the output channel 87.

Figure 7:
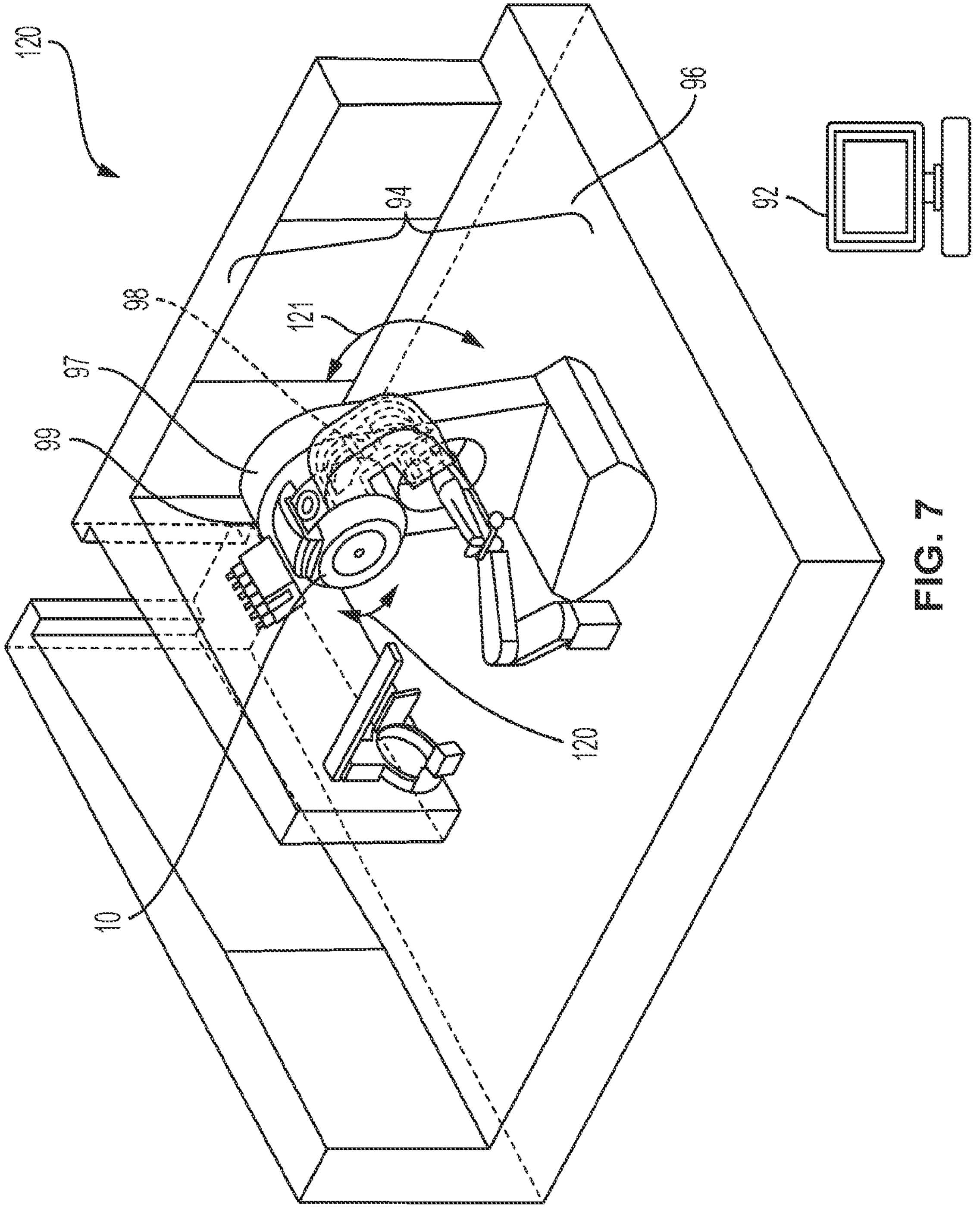
FIG. 7 is a perspective view of another example particle therapy system that may include the particle accelerator.

Another example particle therapy system 120 that uses the accelerator and techniques described herein includes a gantry, as shown in FIG. 7. Gantry 94 may be rotationally or axially connected to a treatment room floor 96, enabling controlled movement of gantry 94 relative to the treatment room floor. In this example, particle accelerator 10 is mounted on the gantry and is rotatable around the patient with the gantry to direct the particle beam in the directions of arrows 121. Gantry 94 may include an arm 97 that runs the length of gantry 94 and that reaches the treatment room floor 96. Particle accelerator 10 and connected beamline structure 98 are rotatably mounted to arm 97. That is, particle accelerator 10 and connected beamline structure 98 are connected to an end 99 of arm 97 so that particle accelerator 10 and connected beamline structure 98 are able to rotate at end 99 in the directions of arrows 122. This rotation is separate from the gantry rotation described herein. The beamline structure may contain magnetics to bend the particle beam for application close to the patent. For example, the beamline structure may include magnetics to bend the particle beam by more than 90° towards the irradiation target, such as 100°, 110°, 120°, or more.

Figure 12:
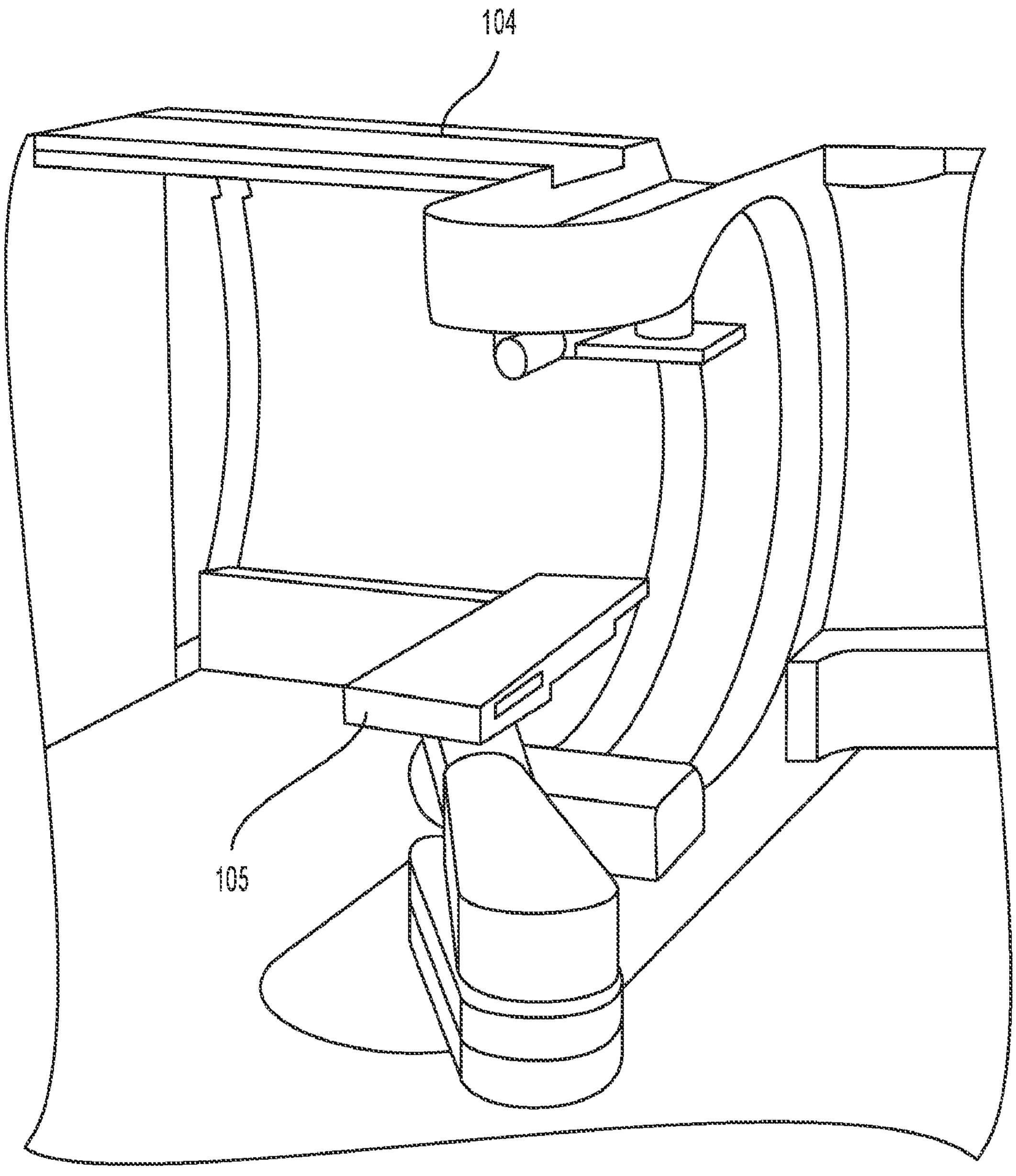
FIG. 12 is a perspective view of an example particle therapy system that may include the particle accelerator.

FIG. 12 shows parts an example of a proton therapy system 104 containing a particle accelerator mounted on a gantry that uses the accelerator and techniques described herein. Because the accelerator is mounted on the gantry, the particle accelerator is in or adjacent to the treatment room. In some implementations, the gantry is steel and has two legs (not shown) mounted for rotation on two respective bearings that lie on opposite sides of a patient. The gantry may include a steel truss (not shown) that is connected to each of its legs, that is long enough to span a treatment area in which the patient lies, and that is attached at both ends to the rotating legs of the gantry. The particle accelerator may be supported by the steel truss for motion around the patient. In the example of FIG. 12, the patient fits on a treatment couch 105. Treatment couch 105 includes a platform that supports the patient.

Operation of the example particle accelerators and particle therapy systems described herein, and operation of all or some component thereof, can be controlled, at least in part, using a control system 92 (FIGS. 6 and 7) configured to execute one or more computer program products, e.g., one or more computer programs tangibly embodied in one or more non-transitory machine-readable media, for execution by, or to control the operation of, one or more data processing apparatus, e.g., a programmable processor, a computer, multiple computers, and/or programmable logic components.

All or part of the systems described in this specification and their various modifications may be configured or controlled at least in part by one or more computers such as the control system using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the systems described herein can be performed by one or more programmable processors executing one or more computer programs to control or to perform all or some of the operations described herein. All or part of the systems and processes can be configured or controlled by special purpose logic circuitry, such as, an FPGA (field programmable gate array) and/or an ASIC (application-specified integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

In the description and claims provided herein, the adjectives "first", "second", "third", and the like need not designate priority or order unless context suggests otherwise. Instead, these adjectives may be used solely to differentiate the nouns that they modify.

Any mechanical or electrical connection herein may include a direct physical connection or an indirect physical connection that includes one or more intervening components. An electrical connection may be wired and/or wireless.

Other implementations not specifically described in this specification are also within the scope of the following claims.

What is claimed is:

1. A particle accelerator comprising:

a particle source to inject particles into a magnetic cavity from ionized plasma;

circuitry to provide a radio frequency (RF) voltage to the magnetic cavity during injecting the particles into the magnetic cavity and during accelerating the particles in orbits in the magnetic cavity, a variation in frequencies of the RF voltage over time having a first waveform during injecting the particles and a second waveform during accelerating the particles, the first waveform having a downward slope and the second waveform having a downward slope;

wherein, at same frequencies of the first and second waveforms, the downward slope of the first waveform when the particles are injected into the magnetic cavity is less than the downward slope of the second waveform when the particles are accelerated in the magnetic cavity; and an extraction channel to receive the particles from the magnetic cavity for output as a particle beam from the particle accelerator.

2. The particle accelerator of claim 1, wherein the downward slope of the first waveform when the particles are injected into the magnetic cavity is a first slope and the downward slope of the second waveform when the particles are accelerated in the magnetic cavity is a second slope.

3. The particle accelerator of claim 2, wherein the first slope is at least 50% less than the second slope; or wherein the first slope is at least 30% less than the second slope; or wherein the first slope is at least 20% less than the second slope.

4. The particle accelerator of claim 2, wherein the first slope being less than the second slope corresponds to an increase in current in the particle beam that is proportional to a difference between the first slope and the second slope.

5. The particle accelerator of claim 1, wherein the circuitry comprises:

an RF controller comprising rotating capacitors to vary the RF voltage, a rotating capacitor comprising plates having shapes configured to generate the first waveform and the second waveform.

6. The particle accelerator system of claim 1, wherein the particle beam is output at a FLASH dose.

7. The particle accelerator of claim 1, wherein the particle beam is output at a dose that exceeds twenty (20) Gray-per-second for a duration of less than five (5) seconds.

8. A particle therapy system comprising:

the particle accelerator of claim 1;

a control system to control the particle source in accordance with the RF voltage; and a gantry configured to enable output of the particle beam to a patient.

9. The particle therapy system of claim 8, wherein the gantry comprises a conduit to transport the particle beam, the conduit comprising a magnetic dipole configured to bend the particle beam by at least 90° towards the patient, the magnetic dipole being mounted for rotation around the gantry.

10. The particle therapy system of claim 9, wherein the magnetic dipole is configured to bend the particle beam by at least 90° in a presence of a magnetic field of at least 3 Tesla (T).

11. The particle accelerator of claim 1, wherein the particle source comprises:

a tube to introduce gas into a region of the magnetic cavity where the particles are to be accelerated, the tube having an opening through which the particles are discharged into the region;

electrodes on different ends of the tube for applying an electrical potential to ionize the gas and thereby produce plasma comprising the particles; and a valve that is controllable to allow, or to prevent, the gas from reaching the opening.

12. The particle accelerator of claim 11, wherein the valve is within the tube and is closer to the opening than to either of the electrodes.

13. The particle accelerator of claim 11, wherein the valve comprises a piezoelectric displacement valve.

14. The particle accelerator of claim 11, wherein a pressure of the gas within the tube is $10^{-4}$ Torr (0.0133322 Pascal (Pa)) or greater.

15. The particle accelerator of claim 11, wherein ionizing the gas produces the plasma in the tube, the plasma having at least a predefined particle density.

16. The particle accelerator of claim 11, wherein the valve is three centimeters (3 cm) or less from the opening; or wherein the valve is two centimeters (2 cm) or less from the opening; or wherein the valve is between one centimeter (1 cm) and four centimeters (cm) from the opening.

17. The particle accelerator of claim 11, wherein the electrodes comprise cathodes that are charged periodically, thereby producing electrical pulses that ionize the gas to produce the plasma and discharge the particles into the region.

18. The particle accelerator of claim 17, wherein the electrical pulses are produced every millisecond or more for a duration on the order of single-digit microseconds.

19. The particle accelerator of claim 11, wherein the tube is completely separated at the region.

20. The particle accelerator of claim 11, wherein the tube contains an opening at the region but is not completely separated at the region.

* * * * *